United States Patent
Chong et al.

(10) Patent No.: US 12,221,867 B2
(45) Date of Patent: Feb. 11, 2025

(54) EVENT DRIVEN CONTROL SCHEMAS FOR ARTIFICIAL LIFT

(71) Applicants: Sensia LLC, Houston, TX (US); SCHLUMBERGER TECHNOLOGY CORPORATION, Sugar Land, TX (US)

(72) Inventors: Jonathan Wun Shiung Chong, Richmond, TX (US); T. Everett Chambliss, Houston, TX (US); Magnus Hedlund, Tomball, TX (US); David Rossi, Houston, TX (US); Nam Nguyen, Houston, TX (US); Pengyu Yuan, Houston, TX (US); Albert Hoefel, Sugar Land, TX (US)

(73) Assignees: SENSIA LLC, Houston, TX (US); SCHLUMBERGER TECHNOLOGY CORPORATION, Sugar Lands, TX (US)

( * ) Notice: Subject to any disclaimer, the term of this patent is extended or adjusted under 35 U.S.C. 154(b) by 456 days.

(21) Appl. No.: 17/432,363

(22) PCT Filed: Feb. 20, 2020

(86) PCT No.: PCT/US2020/019090
§ 371 (c)(1),
(2) Date: Aug. 19, 2021

(87) PCT Pub. No.: WO2020/172447
PCT Pub. Date: Aug. 27, 2020

(65) Prior Publication Data
US 2022/0170353 A1 Jun. 2, 2022

Related U.S. Application Data

(60) Provisional application No. 62/808,345, filed on Feb. 21, 2019.

(51) Int. Cl.
*E21B 43/12* (2006.01)
*E21B 47/008* (2012.01)

(52) U.S. Cl.
CPC .......... *E21B 43/121* (2013.01); *E21B 47/008* (2020.05); *E21B 2200/20* (2020.05)

(58) Field of Classification Search
CPC ... E21B 47/008; E21B 43/121; E21B 2200/20
See application file for complete search history.

(56) References Cited

U.S. PATENT DOCUMENTS

| | | | |
|---|---|---|---|
| 9,394,899 B2 | 7/2016 | Garvey et al. | |
| 2016/0145991 A1* | 5/2016 | Yarus | E21B 47/022 700/275 |

(Continued)

FOREIGN PATENT DOCUMENTS

| WO | WO-2013/106593 A1 | 7/2013 |
| WO | WO-2015/153621 A1 | 10/2015 |
| WO | WO-2015/179775 A1 | 11/2015 |
| WO | WO-2018/165352 A1 | 9/2018 |

OTHER PUBLICATIONS

EP Office Action on EP Appl. Ser. No. 20 712 166.6 dated Nov. 22, 2022 (6 pages).

(Continued)

*Primary Examiner* — Robert E Fuller
(74) *Attorney, Agent, or Firm* — Foley & Lardner LLP

(57) ABSTRACT

A system for oil and gas production includes a drilling, pipeline, or power quality device, a sensor, and a storage device. The storage device has instructions stored thereon that, when executed by one or more processors, cause the one or more processors to perform operations. The operations include receiving first data from the sensor. The operations include determining whether the device is experiencing an event condition based on the first data The operations include generating one or more potential correc- (Continued)

tive actions responsive to a determination that the device is experiencing the event condition. The operations include calculating a reward value for each of the one or more potential corrective actions. The operations include identifying a first corrective action of the one or more potential corrective actions with a largest or most positive reward value The operations include controlling the device according to the first corrective action.

16 Claims, 15 Drawing Sheets

(56) References Cited

U.S. PATENT DOCUMENTS

2017/0363088 A1 12/2017 Nguyen et al.
2021/0324723 A1* 10/2021 Madasu .................. E21B 44/00

OTHER PUBLICATIONS

PCT International Search Report and Written Opinion for International Application No. PCT/US2020/019090, mailing date May 6, 2020, 14 pages.
PCT Preliminary Report on Patentability for International Application No. PCT/US2020/019090 mailing date Sep. 2, 2021, 8 pages.
EPO Office Action for EPO Appl. Ser. No. 20712166.6 dated Jun. 4, 2024 (3 pages).

\* cited by examiner

EVENT DRIVEN CONTROL SCHEMAS FOR ARTIFICIAL LIFT

CROSS-REFERENCE TO RELATED PATENT APPLICATIONS

The present application claims priority to and the benefit of U.S. Provisional Application No. 62/808,345, filed Feb. 21, 2019, which is incorporated herein by reference in its entirety.

BACKGROUND

Various types of field operations can utilize a controller. For example, consider one or more types of enhanced recovery operations, which can include enhanced oil recovery (EOR) types of operations. EOR can involve various techniques that alter properties of oil, which may be initiated at one or more times during the productive life of an oil reservoir. As to some examples, EOR may aim to restore formation pressure, improve oil displacement or fluid flow in the reservoir. Various types of EOR operations include chemical flooding (e.g., alkaline flooding or micellar-polymer flooding), miscible displacement (e.g., carbon dioxide injection or hydrocarbon injection), and thermal recovery (e.g., steamflood or in-situ combustion). The optimal application of each type depends on various types of parameters (e.g., consider one or more of reservoir temperature, pressure, depth, net pay, permeability, residual oil and water saturations, porosity and fluid properties such as oil API gravity and viscosity). As an example, a controller may be utilized to control one or more pieces of equipment involved in performing one or more types of EOR operations.

Another type of recovery operation can be artificial lift. Artificial lift technology can add energy to fluid to enhance production of the fluid. Artificial lift systems can include rod pumping systems, gas lift systems and electric submersible pump (ESP) systems. As an example, an artificial lift pumping system can utilize a surface power source to drive a downhole pump assembly. As an example, a beam and crank assembly may be utilized to create reciprocating motion in a sucker-rod string that connects to a downhole pump assembly. In such an example, the pump can include a plunger and valve assembly that converts the reciprocating motion to fluid movement (e.g., lifting the fluid against gravity, etc.). As an example, an artificial lift gas lift system can provide for injection of gas into production tubing to reduce the hydrostatic pressure of a fluid column. In such an example, a resulting reduction in pressure can allow reservoir fluid to enter a wellbore at a higher flow rate. A gas lift system can provide for conveying injection gas down a tubing-casing annulus where it can enter a production train through one or more gas-lift valves (e.g., a series of gas-lift valves, etc.). As an example, an ESP can include a stack of impeller and diffuser stages where the impellers are operatively coupled to a shaft driven by an electric motor. As an example, an ESP can include a piston that is operatively coupled to a shaft driven by an electric motor, for example, where at least a portion of the shaft may include one or more magnets and form part of the electric motor. As an example, a controller may be utilized to control one or more pieces of equipment involved in performing one or more types of artificial lift operations.

SUMMARY

One embodiment of the present disclosure is a system for oil and gas production. The system includes a drilling, pipeline, or power quality device, a sensor associated with the drilling, pipeline, or power quality device, and a storage device having instructions stored thereon that, when executed by one or more processors, cause the one or more processors to perform operations. The operations include receiving first data from the sensor, the first data indicating a parameter of the device, determining whether the device is experiencing an event condition based on the first data, generating one or more potential corrective actions responsive to a determination that the device is experiencing the event condition, the one or more potential corrective actions each including a change to the parameter of the device, calculating a reward value for each of the one or more potential corrective actions, identifying a first corrective action of the one or more potential corrective actions with a largest or most positive reward value, and controlling the device according to the first corrective action.

In some embodiments, the operations further include receiving second data from the sensor associated with the device, the second data received after controlling the device based on the first corrective action, where the reward value for the first corrective action is based in part on the second data.

In some embodiments, the operations further include determining whether the device is still experiencing the event condition based on the second data, generating a second corrective action based on a determination that the device is still experiencing the event condition, and controlling the device based on the second corrective action.

In some embodiments, generating one or more potential corrective actions further includes determining a severity associated with the event condition, inputting the severity of the event condition and a type of the event condition to a model of the system, and selecting, from an output of the model, the one or more potential corrective actions, where the output of the model is a Gaussian distribution of potential actions.

In some embodiments, the operations further include training the model according to a predetermined policy.

In some embodiments, identifying the event condition includes determining a likelihood for each of one or more event conditions associated with the device, and comparing the likelihood for each of the one or more event conditions, where a condition of the one or more event conditions with the highest likelihood is identified as the event condition.

In some embodiments, calculating the reward value for each of the one or more potential corrective actions further includes determining a past reward value and a future reward value for each of the one or more potential corrective actions, where the reward value for each of the one or more potential corrective actions is based in part on the past reward value and the future reward value.

In some embodiments, the one or more potential corrective actions are generated according to a constraint that limits the change to the parameter of the device.

In some embodiments, the operations further include determining an impact of each of the one or more potential corrective actions on a likelihood for each of one or more other event conditions, where the reward value for each of the one or more potential corrective actions is based in part on the impact.

Another embodiment of the present disclosure is a method for automatic event detection and correction for oil and gas production equipment. The method including receiving first data from a sensor associated with the equipment, the first data indicating a parameter of the equipment, determining whether the equipment is experiencing an event condition based on the first data, generating one or more potential corrective actions responsive to a determination that the device is experiencing the event condition, the one or more potential corrective actions each including a change to the parameter of the equipment, calculating a reward value for each of the one or more potential corrective actions, identifying a first corrective action of the one or more potential corrective actions with a largest or most positive reward value, and controlling the equipment according to the first corrective action.

In some embodiments, the method further includes receiving second data from the sensor associated with the equipment, determining whether the equipment is still experiencing the event condition based on the second data, generating a second corrective action based on a determination that the equipment is still experiencing the event condition, and controlling the equipment based on the second corrective action.

In some embodiments, generating one or more potential corrective actions further includes determining a severity associated with the event condition, inputting the severity of the event condition and a type of the event condition to a model of the system, and selecting, from an output of the model, the one or more potential corrective actions, where the output of the model is a Gaussian distribution of potential actions.

In some embodiments, the method further includes training the model according to a predetermined policy.

In some embodiments, identifying the event condition includes determining a likelihood for each of one or more event conditions associated with the equipment, and comparing the likelihood for each of the one or more event conditions, where a condition of the one or more event conditions with the highest likelihood is identified as the event condition.

In some embodiments, calculating the reward value for each of the one or more potential corrective actions further includes determining a past reward value and a future reward value for each of the one or more potential corrective actions, where the reward value for each of the one or more potential corrective actions is based in part on the past reward value and the future reward value.

In some embodiments, the one or more potential corrective actions are generated according to a constraint that limits the change to the parameter of the device.

In some embodiments, the method further includes determining an impact of each of the one or more corrective actions on a likelihood for each of one or more other event conditions, where the reward value for each of the one or more potential corrective actions is based in part on the impact.

Yet another embodiment of the present disclosure is a system. The system includes electrical or mechanical oil and gas production equipment, a sensor associated with the equipment, and a controller configured to receive first data from a sensor associated with the equipment, the first data indicating a parameter of the equipment, determine whether the equipment is experiencing an event condition based on the first data, generate a first corrective action responsive to a determination that the equipment is experiencing the event condition, the first corrective action including a change to the parameter of the equipment, control the equipment based on the first corrective action, receiving second data from the sensor associated with the equipment, the second data received after controlling the equipment based on the first corrective action, and determine a reward value for the first corrective action based on the second data.

In some embodiments, the first corrective action is generated according to a constraint that limits that limits the change to the parameter of the device.

In some embodiments, generating the first corrective action further includes inputting a type of the event condition into a model of the system, determining, based on an output of the model, a plurality of potential corrective actions, selecting, from the plurality of potential corrective actions, the first corrective action.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
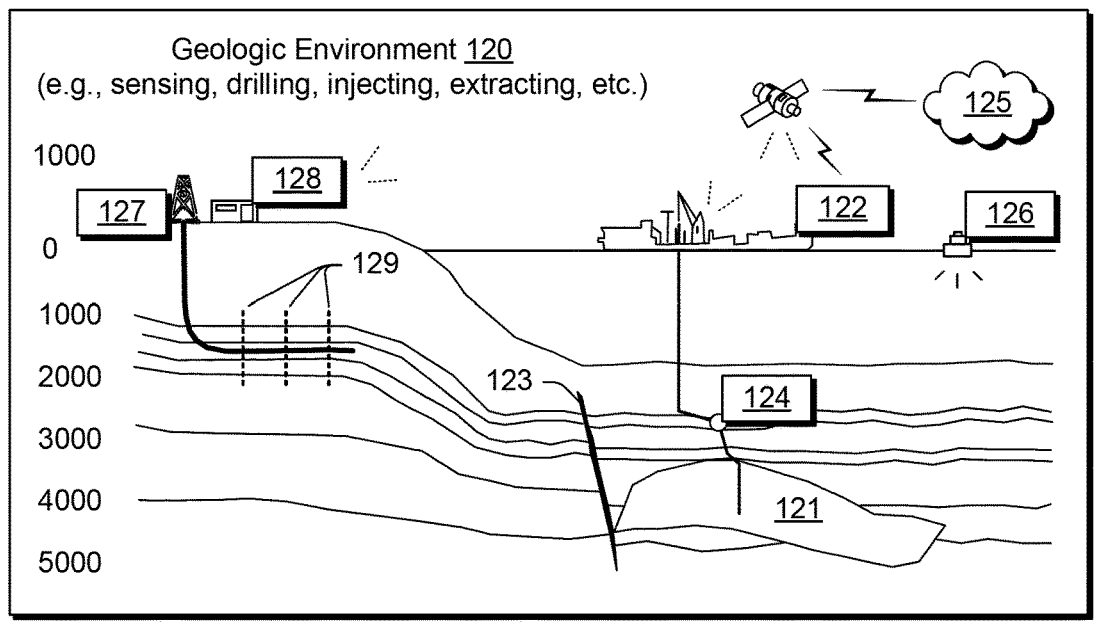
FIG. 1 is a drawing illustrating various example equipment in geologic environments, according to some embodiments.
Figure 1:
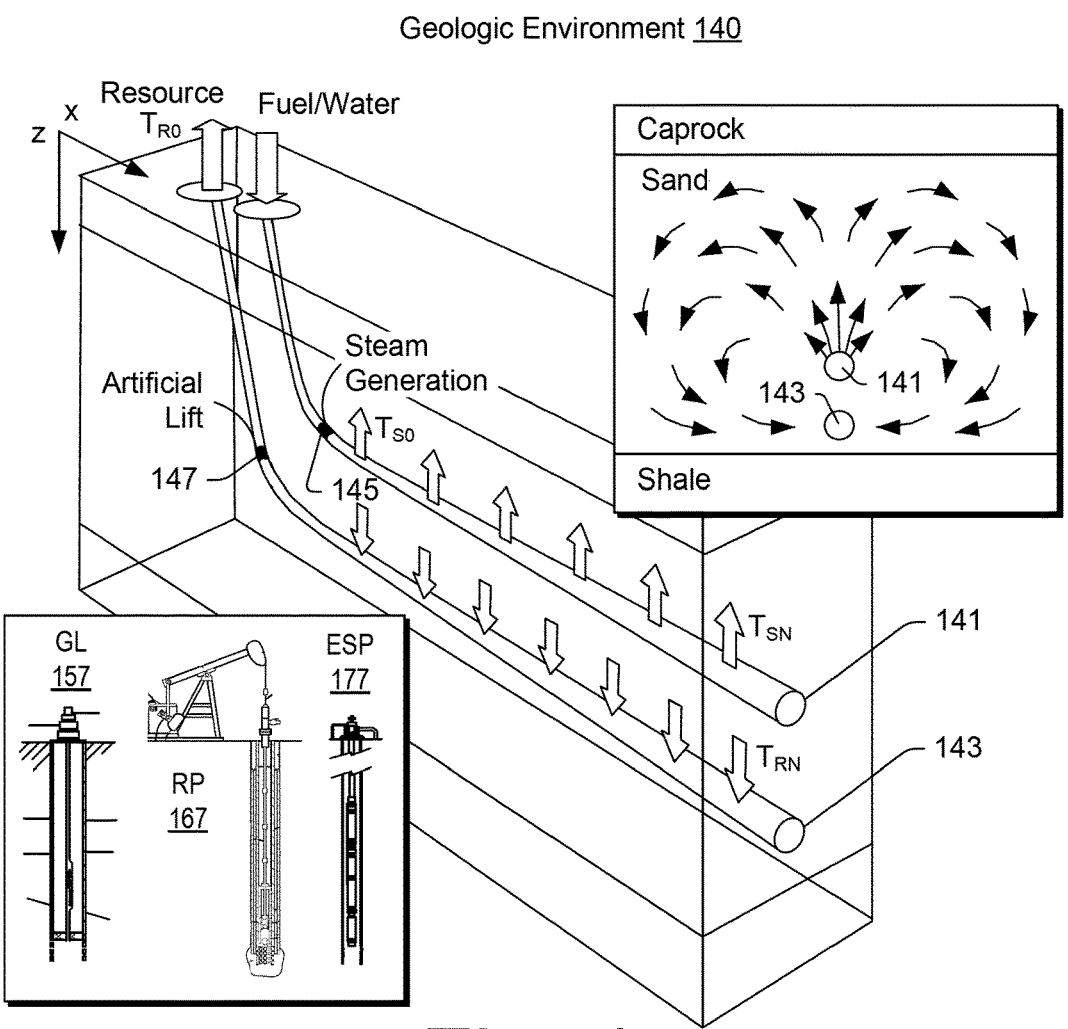

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, a controller may be utilized in one or more types of recovery operations (e.g., EOR, artificial lift, etc.).

As mentioned, artificial lift technology can add energy to fluid to enhance production of the fluid. Artificial lift systems can include rod pumping (RP) systems, gas lift (GL) systems and electric submersible pump (ESP) systems. As an example, an artificial lift pumping system can utilize a surface power source to drive a downhole pump assembly. As an example, a beam and crank assembly may be utilized to create reciprocating motion in a sucker-rod string that connects to a downhole pump assembly. In such an example, the pump can include a plunger and valve assembly that converts the reciprocating motion to fluid movement (e.g., lifting the fluid against gravity, etc.).

As an example, an artificial lift gas lift system can provide for injection of gas into production tubing to reduce the hydrostatic pressure of a fluid column. In such an example, a resulting reduction in pressure can allow reservoir fluid to enter a wellbore at a higher flow rate. A gas lift system can provide for conveying injection gas down a tubing-casing annulus where it can enter a production train through one or more gas lift valves (e.g., a series of gas lift valves, etc.). A gas lift valve position, operating pressures and gas injection rate can be determined by specific well conditions.

In another example, an ESP can include a stack of impeller and diffuser stages where the impellers are operatively coupled to a shaft driven by an electric motor. As an example, an ESP can include a piston that is operatively coupled to a shaft driven by an electric motor, for example, where at least a portion of the shaft may include one or more magnets and form part of the electric motor. As an example, an ESP may be equipped with a rotating shaft driven by an electric motor or an ESP may be equipped with a reciprocating shaft driven by an electric motor (e.g., linear permanent magnet motor, etc.).

In some embodiments, any drilling, pipeline, or power quality device utilized in the oil and gas production industry may utilize a controller as described here. A drilling, pipeline, or power quality device may be, for example, a fluid transfer device (e.g., a pump), a pipeline (e.g., for transporting fluid such as oil), a power quality analyzer (e.g., for an artificial lift system or a well), or any other similar device. Generally, the drilling, pipeline, or power quality device may be utilized in the field of oil and gas production. As described herein, a drilling, pipeline, or power quality device or oil and gas production equipment may be any equipment that can be controlled via a controller and/or the systems described in the present disclosure. For example, a pipeline may include a choke or a variable position valve (e.g., a control actuator) to manage flow. In this example, the choke or valve of the pipeline may be operated by a controller (e.g., by opening or closing the valve) using any of the methods described herein.

Referring to FIG. 1, examples of geologic environments 120 and 140 are shown, according to some embodiment. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, etc.

As to the geologic environment 140, as shown in FIG. 1, it includes two wells 141 and 143 (e.g., bores), which may be, for example, disposed at least partially in a layer such as a sand layer disposed between caprock and shale. As an example, the geologic environment 140 may be outfitted with equipment 145, which may be, for example, steam assisted gravity drainage (SAGD) equipment for injecting steam for enhancing extraction of a resource from a reservoir. SAGD is a technique that involves subterranean delivery of steam to enhance flow of heavy oil, bitumen, etc. SAGD can be applied for Enhanced Oil Recovery (EOR), which is also known as tertiary recovery because it changes properties of oil in situ.

As an example, a SAGD operation in the geologic environment 140 may use the well 141 for steam-injection and the well 143 for resource production. In such an example, the equipment 145 may be a downhole steam generator and the equipment 147 may be an electric submersible pump (e.g., an ESP).

FIG. 1 also shows various examples of artificial lift equipment including a gas lift (GL) system 157, a rod pumping (RP) system 167, and an ESP system 177. Such equipment may be disposed at least in part in a downhole environment to facilitate production of fluid; noting that a pump system (e.g., RP and/or ESP) may be utilized to move fluid to a location other than a surface location (e.g., consider injection to inject fluid into a subterranean region, etc.). A gas lift system operates at least in part on buoyancy as injected gas may be expected to rise due to buoyancy in a direction that is opposite gravity; whereas, a RP or an ESP may operate via mechanical movement of physical components to drive fluid in a desired direction, which may be with or against gravity.

As illustrated in a cross-sectional view of FIG. 1, as to SAGD as an enhanced recovery technique, steam is injected via the well 141 where the steam may rise in a subterranean portion of the geologic environment and transfer heat to a desirable resource such as heavy oil. In turn, as the resource is heated, its viscosity decreases, allowing it to flow more readily to the well 143 (e.g., a resource production well). In such an example, equipment 147 (e.g., an ESP) may then assist with lifting the resource in the well 143 to, for example, a surface facility (e.g., via a wellhead, etc.). As an example, where a production well includes artificial lift equipment such as an ESP, operation of such equipment may be impacted by the presence of condensed steam (e.g., water in addition to a desired resource). In such an example, an ESP may experience conditions that may depend in part on operation of other equipment (e.g., steam injection, operation of another ESP, etc.). While an ESP is mentioned, GL equipment and/or RP equipment may experience conditions that may depend in part on operation of other equipment. As an example, one or more technologies may be implemented to enhance recovery of fluid, inject fluid, etc.

Conditions in a geologic environment may be transient and/or persistent. Where equipment is placed within a geologic environment, longevity of the equipment can depend on characteristics of the environment and, for example, duration of use of the equipment as well as function of the equipment. Where equipment is to endure in an environment over an extended period of time, uncertainty may arise in one or more factors that could impact integrity or expected lifetime of the equipment. As an example, where a period of time may be of the order of decades, equipment that is intended to last for such a period of time may be constructed to endure conditions imposed thereon, whether imposed by an environment or environments and/or one or more functions of the equipment itself.

Figure 2:
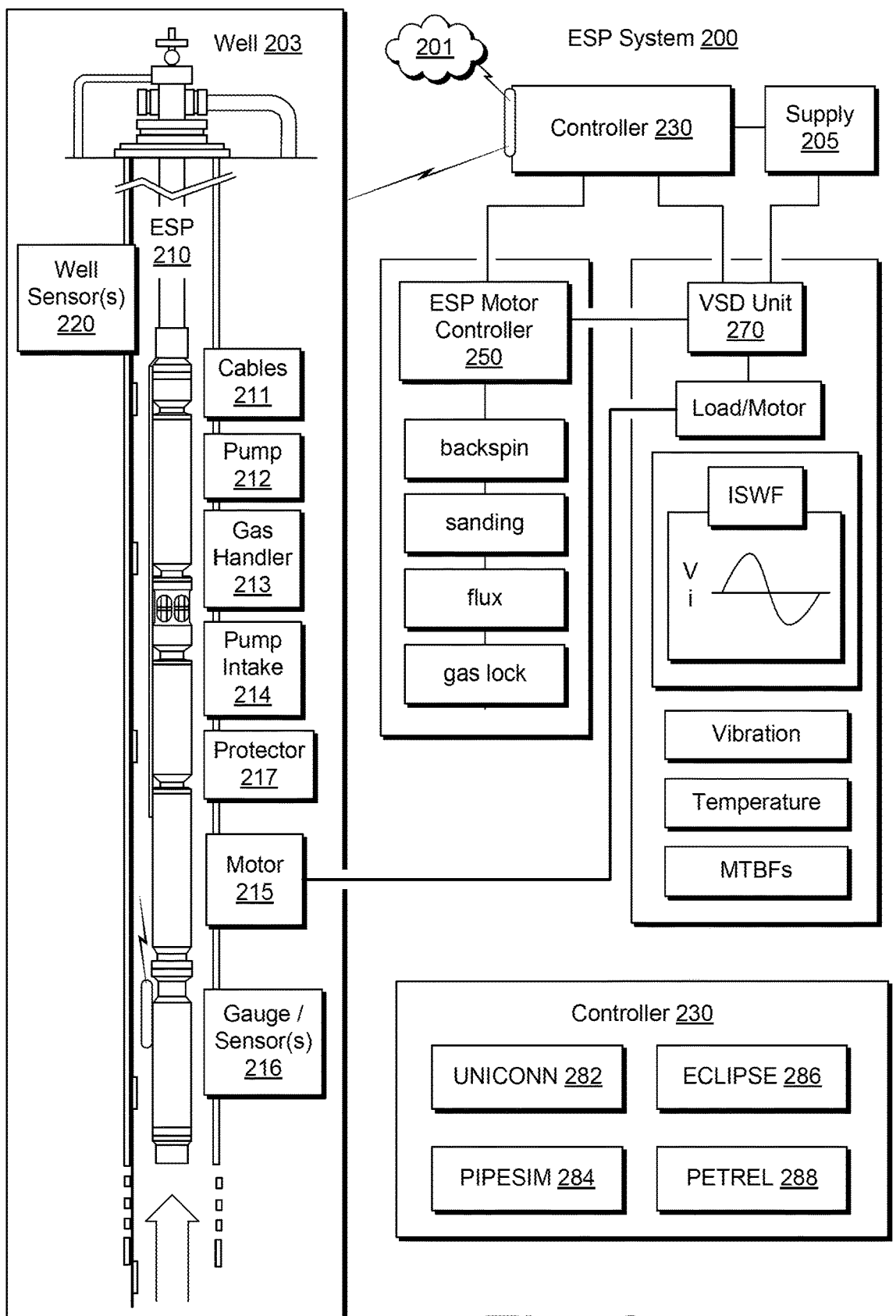
FIG. 2 is an example of an electric submersible pump (ESP), according to some embodiments.

Referring now to FIG. 2, an example of an ESP system 200 that includes an ESP 210 as an example of equipment that may be placed in a geologic environment is shown, according to some embodiments. As an example, an ESP may be expected to function in an environment over an extended period of time (e.g., optionally of the order of years). As an example, commercially available ESPs (such as the REDA™ ESPs marketed by Schlumberger Limited, Houston, Texas) may find use in applications that call for, for example, pump rates in excess of about 4,000 barrels per day and lift of about 12,000 feet or more.

In the example of FIG. 2, the ESP system 200 includes a network 201, a well 203 disposed in a geologic environment (e.g., with surface equipment, etc.), a power supply 205, the ESP 210, a controller 230, a motor controller 250 and a VSD unit 270. The power supply 205 may receive power from a power grid, an onsite generator (e.g., natural gas driven turbine), or other source. The power supply 205 may supply a voltage, for example, of about 4.16 kV.

As shown, the well 203 includes a wellhead that can include a choke (e.g., a choke valve). For example, the well 203 can include a choke valve to control various operations such as to reduce pressure of a fluid from high pressure in a closed wellbore to atmospheric pressure. Adjustable choke valves can include valves constructed to resist wear due to high-velocity, solids-laden fluid flowing by restricting or sealing elements. A wellhead may include one or more sensors such as a temperature sensor, a pressure sensor, a solids sensor, etc.

As to the ESP 210, it is shown as including cables 211 (e.g., or a cable), a pump 212, gas handling features 213, a pump intake 214, a motor 215, one or more sensors 216 (e.g., temperature, pressure, strain, current leakage, vibration, etc.) and optionally a protector 217.

As an example, an ESP may include a REDA™ HOTLINE™ high-temperature ESP motor. Such a motor may be suitable for implementation in a thermal recovery heavy oil production system, such as, for example, SAGD system or other steam-flooding system.

As an example, an ESP motor can include a three-phase squirrel cage with two-pole induction. As an example, an ESP motor may include steel stator laminations that can help focus magnetic forces on rotors, for example, to help reduce energy loss. As an example, stator windings can include copper and insulation.

In the example of FIG. 2, the well 203 may include one or more well sensors 220, for example, such as the commercially available OPTICLINE™ sensors or WELL-WATCTER BRITEBLUE™ sensors marketed by Schlumberger Limited (Houston, Texas). Such sensors are fiber-optic based and can provide for real time sensing of temperature, for example, in SAGD or other operations. As shown in the example of FIG. 1, a well can include a relatively horizontal portion. Such a portion may collect heated heavy oil responsive to steam injection. Measurements of temperature along the length of the well can provide for feedback, for example, to understand conditions downhole of an ESP. Well sensors may extend thousands of feet into a well (e.g., 4,000 feet or more) and beyond a position of an ESP.

In the example of FIG. 2, the controller 230 can include one or more interfaces, for example, for receipt, transmission or receipt and transmission of information with the motor controller 250, a VSD unit 270, the power supply 205 (e.g., a gas fueled turbine generator, a power company, etc.), the network 201, equipment in the well 203, equipment in another well, etc.

As shown in FIG. 2, the controller 230 may include or provide access to one or more modules or frameworks. Further, the controller 230 may include features of an ESP motor controller and optionally supplant the ESP motor controller 250. For example, the controller 230 may include the UNICONN™ motor controller 282 marketed by Schlumberger Limited (Houston, Texas). In the example of FIG. 2, the controller 230 may access one or more of the PIPESIM™ framework 284, the ECLIPSE™ framework 286 marketed by Schlumberger Limited (Houston, Texas) and the PETREL™ framework 288 marketed by Schlumberger Limited (Houston, Texas) (e.g., and optionally the OCEAN™ framework marketed by Schlumberger Limited (Houston, Texas)).

In the example of FIG. 2, the motor controller 250 may be a commercially available motor controller such as the UNICONN™ motor controller. The UNICONN™ motor controller can connect to a SCADA system, the ESPWATCHER™ surveillance system, etc. The UNICONN™ motor controller can perform some control and data acquisition tasks for ESPs, surface pumps or other monitored wells. The UNICONN™ motor controller can interface with the PHOENIX™ monitoring system, for example, to access pressure, temperature and vibration data and various protection parameters as well as to provide direct current power to downhole sensors (e.g., sensors of a gauge, etc.).

The PHOENIX™ monitoring system includes a "gauge", which can be available in various configurations. As an example, a configuration of the gauge may provide for measurement of intake pressure and temperature, motor oil or motor winding temperature, vibration, and current leakage. As another example, a configuration of the gauge can provide for measurement of pump discharge pressure, which can be used in evaluating pump performance.

The PHOENIX™ monitoring system includes high-temperature microelectronics and digital telemetry circuitry that can communicates with surface equipment through an ESP motor cable. The electrical system of the PHOENIX™ monitoring system has a tolerance for high phase imbalance and a capacity to handle voltage spikes.

As an example, a controller can be operatively coupled to the PHOENIX™ monitoring system, for example, to provide remote access and control. Data can be integrated with a real-time surveillance service that may provide for robust surveillance of monitored parameters (e.g., via satellite and/or other network technologies). The PHOENIX™ monitoring system is SCADA ready and has a MODBUS protocol terminal with RS232 and RS485 ports for data output.

As to some examples of gauge parameters, consider Table 1 below.

TABLE 1

Example Gauge Parameters

| Measurement | Range | Accuracy | Resolution | Drift | Rate |
|---|---|---|---|---|---|
| P Intake | 0-40 MPa | +/−34 | 0.7 | 34/year | 4 s |
| P Discharge | 0-40 MPa | +/−34 | 0.7 | 34/year | 4 s |
| T Intake | 0-150 C. | 1.3% FS | 0.1 | NA | 4 s/8 s |
| T Winding/Oil | 0-409 C. | 1% FS | 0.1 | NA | 36 s |
| Vibration | 0-30 G | 3.3% FS | 0.1 | NA | Variable |
| Current Leak | 0-25 mA | 0.2% FS | 0.001 | NA | Variable |

As to dimensions of a gauge, consider a gauge that is approximately 60 centimeters in length and approximately 11 cm in diameter. Such a gauge may be rated to withstand pressures of approximately 45 MPa and survive for 24 hours at a temperature of approximately 175 degrees C. A surface choke unit may provide for reading sensed information from a three-phase ESP power cable.

The UNICONN™ motor controller can interface with fixed speed drive (FSD) controllers or a VSD unit, for example, such as the VSD unit 270. For FSD controllers, the UNICONN™ motor controller can monitor ESP system three-phase currents, three-phase surface voltage, supply voltage and frequency, ESP spinning frequency and leg ground, power factor and motor load.

For VSD units, the UNICONN™ motor controller can monitor VSD output current, ESP running current, VSD output voltage, supply voltage, VSD input and VSD output power, VSD output frequency, drive loading, motor load, three-phase ESP running current, three-phase VSD input or output voltage, ESP spinning frequency, and leg-ground.

In the example of FIG. 2, the ESP motor controller 250 includes various modules to handle, for example, backspin of an ESP, sanding of an ESP, flux of an ESP and gas lock of an ESP. The motor controller 250 may include any of a variety of features, additionally, alternatively, etc.

In the example of FIG. 2, the VSD unit 270 may be a low voltage drive (LVD) unit, a medium voltage drive (MVD) unit or other type of unit (e.g., a high voltage drive, which may provide a voltage in excess of about 4.16 kV). As an example, the VSD unit 270 may receive power with a voltage of about 4.16 kV and control a motor as a load with a voltage from about 0 V to about 4.16 kV. The VSD unit 270 may include commercially available control circuitry such as the SPEEDSTAR™ MVD control circuitry marketed by Schlumberger Limited (Houston, Texas).

Figure 3:
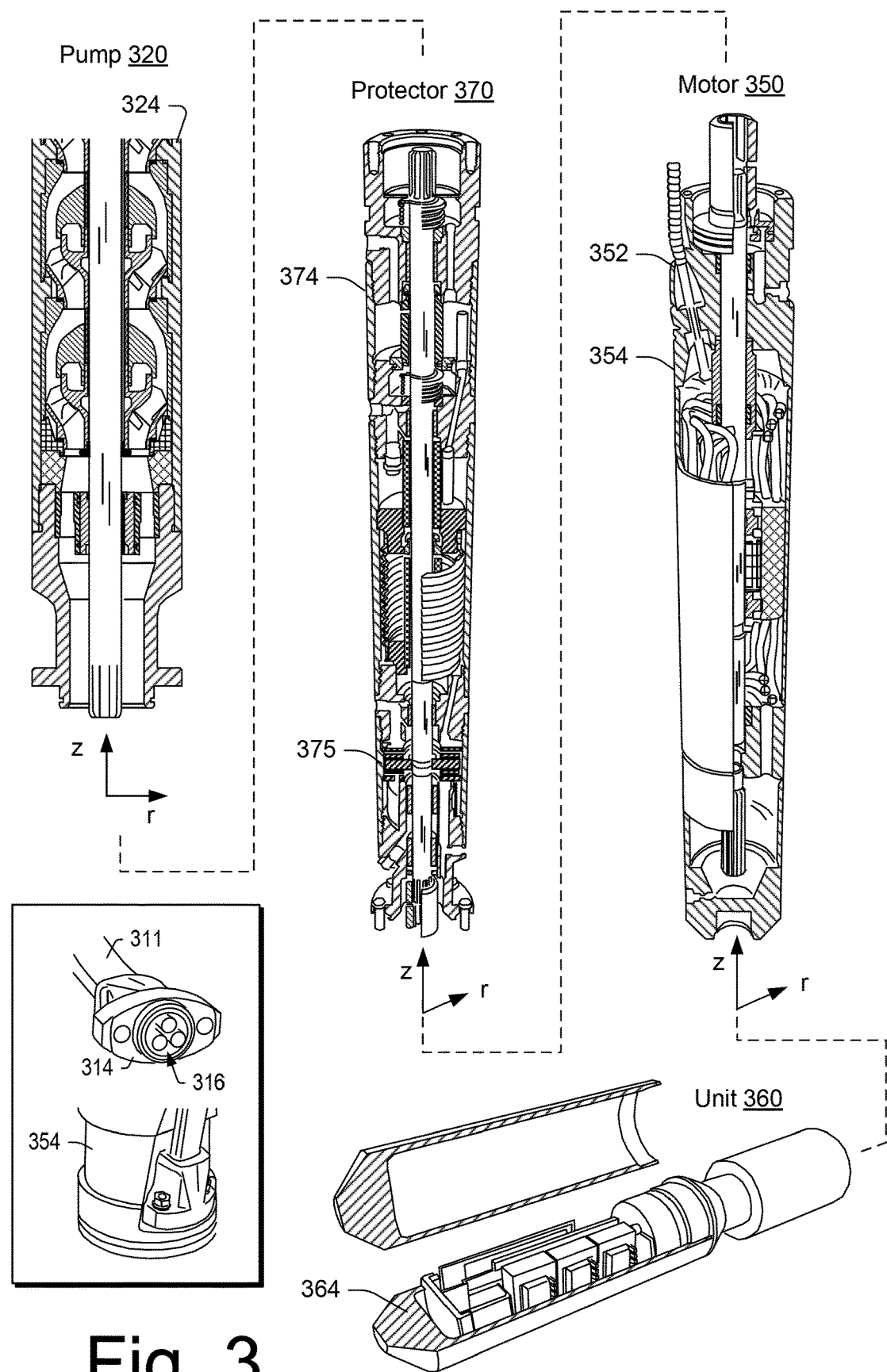
FIG. 3 is a detailed drawing of various components of the ESP of FIG. 3, according to some embodiments.

Referring now to FIG. 3, cut-away views of examples of equipment such as, for example, a portion of a pump 320, a protector 370, a motor 350 of an ESP and a sensor unit 360 (e.g., a gauge) are shown, according to some embodiments. The pump 320, the protector 370, the motor 350 and the sensor unit 360 are shown with respect to cylindrical coordinate systems (e.g., r, z, Θ). Various features of equipment may be described, defined, etc. with respect to a cylindrical coordinate system. As an example, a lower end of the pump 320 may be coupled to an upper end of the protector 370, a lower end of the protector 370 may be coupled to an upper end of the motor 350 and a lower end of the motor 350 may be coupled to an upper end of the sensor unit 360 (e.g., via a bridge or other suitable coupling).

As shown in FIG. 3, the pump 320 can include a housing 324, the motor 350 can include a housing 354, the sensor unit 360 can include a housing 364 and the protector 370 can include a housing 374 where such housings may define interior spaces for equipment. As an example, a housing may have a maximum diameter of up to about 30 cm and a shaft may have a minimum diameter of about 2 cm. As an example, a sensor can include a sensor aperture that is disposed within an interior space of a housing where, for example, an aperture may be in a range of about 1 mm to about 20 mm. In some examples, the size of an aperture may be taken into account, particularly with respect to the size of a shaft (e.g., diameter or circumference of a shaft). As an example, given dynamics that may be experienced during operation of equipment (e.g., a pump, a motor, a protector, etc.), error compensation may be performed that accounts for curvature of a shaft or, for example, curvature of a rotating component connected to the shaft.

As an example, an annular space can exist between a housing and a bore, which may be an open bore (e.g., earthen bore, cemented bore, etc.) or a completed bore (e.g., a cased bore). In such an example, where a sensor is disposed in an interior space of a housing, the sensor may not add to the overall transverse cross-sectional area of the housing. In such an example, risk of damage to a sensor may be reduced while tripping in, moving, tripping out, etc., equipment in a bore.

As an example, a protector can include a housing with an outer diameter up to about 30 cm. As an example, consider a REDA MAXIMUS™ protector (Schlumberger Limited, Houston, Texas), which may be a series 387 with a 3.87 inch housing outer diameter (e.g., about 10 cm) or a series 562 with a 5.62 inch housing outer diameter (e.g., about 14 cm) or another series of protector. As an example, a REDA MAXIMUS™ series 540 protector can include a housing outer diameter of about 13 cm and a shaft diameter of about 3 cm and a REDA MAXIMUS™ series 400 protector can include a housing outer diameter of about 10 cm and a shaft diameter of about 2 cm. In such examples, a shaft to inner housing clearance may be an annulus with a radial dimension of about 5 cm and about 4 cm, respectively. Where a sensor and/or circuitry operatively coupled to a sensor are to be disposed in an interior space of a housing, space may be limited radially; noting that axial space can depend on one or more factors (e.g., components within a housing, etc.). For example, a protector can include one or more dielectric oil chambers and, for example, one or more bellows, bags, labyrinths, etc. In the example of FIG. 3, the protector 370 is shown as including a thrust bearing 375 (e.g., including a thrust runner, thrust pads, etc.).

As to a motor, consider, for example, a REDA MAXIMUS™ PRO MOTOR™ electric motor (Schlumberger Limited, Houston, Texas), which may be a 387/456 series with a housing outer diameter of about 12 cm or a 540/562 series with a housing outer diameter of about 14 cm. As an example, consider a carbon steel housing, a high-nickel alloy housing, etc. As an example, consider an operating frequency of about 30 to about 90 Hz. As an example, consider a maximum windings operating temperature of about 200 degrees C. As an example, consider head and base radial bearings that are self-lubricating and polymer lined.

As an example, consider a pot head that includes a cable connector for electrically connecting a power cable to a motor.

As shown in FIG. 3, a shaft segment of the pump 320 may be coupled via a connector to a shaft segment of the protector 370 and the shaft segment of the protector 370 may be coupled via a connector to a shaft segment of the motor 350. As an example, an ESP may be oriented in a desired direction, which may be vertical, horizontal or other angle (e.g., as may be defined with respect to gravity, etc.). Orientation of an ESP with respect to gravity may be considered as a factor, for example, to determine ESP features, operation, etc.

As shown in FIG. 3, the motor 350 is an electric motor that includes a cable connector 352, for example, to operatively couple the electric motor to a multiphase power cable, for example, optionally via one or more motor lead extensions. Power supplied to the motor 350 via the cable connector 352 may be further supplied to the sensor unit 360, for example, via a wye point of the motor 350 (e.g., a wye point of a multiphase motor).

As an example, a connector may include features to connect one or more transmission lines dedicated to a monitoring system. For example, the cable connector 352 may optionally include a socket, a pin, etc., that can couple to a transmission line dedicated to the sensor unit 360. As an example, the sensor unit 360 can include a connector that can connect the sensor unit 360 to a dedicated transmission line or lines, for example, directly and/or indirectly.

As an example, the motor 350 may include a transmission line jumper that extends from the cable connector 352 to a connector that can couple to the sensor unit 360. Such a transmission line jumper may be, for example, one or more conductors, twisted conductors, an optical fiber, optical fibers, a waveguide, waveguides, etc. As an example, the motor 350 may include a high-temperature optical material that can transmit information. In such an example, the optical material may couple to one or more optical transmission lines and/or to one or more electrical-to-optical and/or optical-to-electrical signal converters.

FIG. 3 shows an example of a cable 311 that includes a connector 314 and conductors 316, which may be utilized to deliver multiphase power to an electric motor and/or to communicate signals and/or to delivery DC power (e.g., to power circuitry operatively coupled to a wye point of an electric motor, one or more sensors, etc.). As an example, the cable connector 352 may be part of a pot head portion of a housing 354. As an example, the cable 311 may be flat or round. As an example, a system may utilized one or more motor lead extensions (MLEs) that connect to one or more cable connectors of an electric motor. As an example, the sensor unit 360 can include transmission circuitry that can transmit information via a wye point of the motor 350 and via the cable connection 352 to the cable 311 where such information may be received at a surface unit, etc. (e.g., consider a choke, etc. that can extract information from one or more multiphase power conductors, etc.).

As an example, a system can include equipment that can perform Automatic Event Detection (AED) for one or more types of field operations (e.g., EOR, artificial lift, etc.). As an example, consider an ESP installed downhole where oil is available and used to lift oil from there to the surface. An ESP failure can lead to cost of replacement and deferred production. As an example, an event may include inducing stress to the ESP such as operating against a closed valve, operating below minimum frequency to lift the fluid to surface or gas locking among others. Some measurements that may be used for detection can include Drive Frequency, Motor Current, Discharge Pressure, Intake Pressure, and Motor Temperature. If more measurements, derived parameters (e.g., from modelling, etc.), or completion information (e.g., pump curves, inflow performance, etc.) are available, they may be used to enhance the detection. Robust AED may be configured to operate where some types of data may be unavailable, suspect, etc. (e.g., for one or more reasons). A document having International Publication Number WO 2016/094530 A1 entitled "Electrical Submersible Pump Event Detection" published Jun. 16, 2016 is incorporated by reference herein (see also PCT/US2015/064737), along with a U.S. Provisional application having Ser. No. 62/089,480 (filed Dec. 9, 2014).

Below, some examples of measurements (e.g., sensor data, etc.) are given:

Channel: There can be multiple sensors placed at different locations as illustrated in FIG. 2. As an example, a set of measurements received from the same sensor may be called a channel.

Amps: Drive current. This measurement represents the load of the pump.

T_m: Motor temperature. This measurement represents the inside motor temperature and can be an indicator to detect if the pump is running below efficiency.

Intake pressure. This measurement represents the pressure at the intake of the pump. When the pump is off, P_i tends to go back reservoir pressure (P_r).

P_d: Discharge pressure. This measurement represents the pressure at the discharge of the pump. It is an indicator for the height of the fluid column above the pump. It can also reflect a restriction above the pump, slugging effect, changing of water cut, etc.

P_r: Reservoir Pressure. Refers to the static pressure to which intake pressure P_i comes back when the pump is turned off.

f: Drive frequency. This measurement represents the speed of the motor (with minor reduction from electrical to mechanical rotation conversion called slip). f has strong effect on both P_d & P_i: P_d increases proportionally and P_i decreases proportionally with the increase off.

t: Time. Over time, the reservoir is depleted gradually. As the result, time has strong effect on P_i since P_i is closely related to reservoir conditions.

Q: Flow rate. This quantity indicates whether there is a Low/No Flow or not. Q depends on both (P_r–P_i) and (P_d–P_i). Therefore, they are useful measurements to detect the Low/No Flow events. Q depends on depth and time, and usually pump flow rate is taken into account for event detection.

ΔP=P_d–P_i: Delta P. As mentioned above, this quantity is an important indicator for the flow rate.

Still referring to FIG. 3, various sensors can be included in a system whether in a gauge or other form(s)/position(s). As an example, such sensors can include temperature sensors. As an example, a temperature sensor can be positioned in a pump section with respect to a stage or adjacent stages to measure temperature at a position or positions. As an example, one or more thermodynamic models may account for movement of fluid, energy transferred to fluid, internal heating of fluid (e.g., viscous heating), heat transfer to and/or from fluid, heat transfer to one or more mechanical components, heat transfer to fluid exterior to a pump section, and heat transfer to tubing, casing, cement, rock, etc. As an example, temperature information sensed by one or more temperature sensors may inform a model or models and/or allow for analysis via one or more learning structures (e.g., ANNs, etc.). As mentioned, one or more types of input can be analyzed to determine one or more state variables (e.g., values for state variables) where sensor data may not provide for one or more of the one or more state variables directly.

As an example, a temperature sensor can be a thermocouple. A thermocouple is an electrical device that can include two dissimilar electrical conductors forming electrical junctions at differing temperatures. In such an example, the thermocouple can produce a temperature-dependent voltage as a result of the thermoelectric effect, and this voltage can be interpreted to measure temperature. As an example, a temperature sensor can be a thermistor, which is a type of resistor whose resistance is dependent on temperature. As an example, one or more temperature sensors can be included in a pump. In such an example, such sensors may be wired and/or wireless to transmit sensed information (e.g., time series data).

As to wireless transmission, one or more antennas may be utilized to emit signals that can be received by another antenna. As an example, a unit such as the 360 of FIG. 3 may include one or more wired and/or wireless interfaces that can receive information from one or more sensors, which can be or include one or more temperature sensors. In such an example, sensed temperature information may be transmitted via a cable, for example, to a surface unit (e.g., a computing system, a controller, a drive, etc.). As an example, a pump section with a series of temperature sensors may output a temperature profile with respect to a longitudinal axis of the pump section, with respect to impellers, with respect to stages, etc. In such an example, fluid may be characterized at least in part on one or more temperature profiled. In such an example, a viscosity profile may be generated that relates viscosity and temperature (e.g., and/or one or more other variables such as power input, shaft rotational speed/impeller speed, pressure, etc.).

In mechanics, position coordinates and velocities of mechanical parts may be state variables; knowing these, it may be possible to determine the future state of the objects in a system. In thermodynamics, a state variable may be a state function; examples include temperature, pressure, volume, internal energy, enthalpy, and entropy; whereas, heat and work may be process functions. In electronic circuits, voltages of nodes and currents through components in the circuit can be state variables. In control engineering, state variables can be used to represent the states of a system. The set of possible combinations of state variable values can be referred to as the state space of the system. Equations relating a current state of a system to its most recent input and past states can be referred to as state equations, and the equations expressing the values of the output variables in terms of the state variables and inputs can be referred to as output equations.

As mentioned, factors such as solids in fluid, gas in fluid, etc., may alter fluid behavior, which may include alteration of viscosity in relationship to temperature, pressure and/or one or more other variables. As an example, where viscosity increases, entrained gas may face more resistance in rising while solids (e.g., particles) may face more resistance in settling. Where entrained gas and solids exist together in a volume of fluid, interactions may occur as entrained gas rises and solids settle. Such interactions may be complex where the volume of fluid is subject to an artificial lift technology (e.g., pumping, gas lift, etc.).

As an example, for an ESP with a pump section that includes multiple stages, energy input into the ESP via a cable to an electric motor that is operatively coupled to a shaft that rotates impellers of the stages, can result in a certain amount of viscous heating of fluid being pumped via rotation of the impellers (or at least a portion of the impellers). As such fluid is heated, its temperature can change and its viscosity may change where that viscosity is temperature dependent and/or where the fluid is multiphase and/or an emulsion, which may exhibit changes that can be a result of the fluid being worked on by impellers and/or other conditions that may exist in the ESP as positioned in a bore to pump the fluid.

Fluid and pump relationships can be multi-variable and can include behaviors that do not necessarily trend because various forces may result in different behavior. For example, as temperature increases due to viscous heating, a drop in viscosity can make the fluid easier to pump such that there may be less drag on certain stages of a multiple stage ESP. Various factors such as inlet pressure, outlet pressure, orientation with respect to gravity, heat transfer from a hot electric motor to fluid passing by the electric motor, etc. can contribute to an energy balance.

As to operation of an ESP, known information can be power supplied to the ESP during operation. Additional known information can be flow rate of produced fluid at a surface location (e.g., a surface flow meter, state of an adjustable choke, etc.). Various other types of information may be known, some of which may be static and some of which may be dynamic.

As to an ESP cable model, such a model can include equations to predict three phase voltage drop across an ESP cable. For example, consider the motor terminal voltage, $V_{abc}' = V_{abc} - Z_{cable} * I_{phase}$ where $V_{abc}$ is the drive voltage, $Z_{cable}$ is the cable impedance, and $I_{phase}$ are the phase currents.

As dynamics of ESP motor electromagnetics tend to be of a smaller time scale than those of various other parts of an ESP system, a steady-state motor electromagnetics model may be suitable for implementation in a dynamic modeling framework that generates one or more digital twins. Such a model may be developed, for example, using an IEEE equivalent circuit which can predict that the motor output torque, Tem is:

$$Tem = 3 * Ir'2 * Rr' / ws * s$$

where Ir' is the rotor current, Rr' is the rotor resistance, ws is the synchronous angular speed, and s is the slip.

A motor electromagnetics model may also predict the segregated losses in a motor, for example: lamination core losses in a stator and rotor, stator winding losses, and viscous shearing losses in a rotor-to-stator "air" gap. Such segregated motor losses can be utilized in a time transient, lumped-parameter motor thermal model of a motor using an energy balance at nodes internal to the motor and at nodes which interface to the external well annulus to predict thermal gradients throughout the motor.

Submersible pump performance (e.g., head and shaft torque) versus shaft speed and flowrate can be modeled using four-quadrant pump characteristics to capture "normal" forward pumping (quadrant I) as well as turbine and energy dissipative modes (quadrants II, III, and IV). "Normal" as-new pump performance is usually given by the pump manufacturer for water at standard conditions. However, pump degradation due to wear (for example increased internal recirculation due to increased seal gaps) can be modelled using degradation factors for flowrate, torque, and head where for example the actual pump discharge flowrate:

$$Q_{act} = Q(1 - Q_{leak}/100)$$

where Q is the ideal flowrate and $Q_{leak}$ is the percentage of recirculation leakage.

For various reasons such as, for example, harshness of downhole environment, remoteness of installation, cost, technology, etc., an ESP system may have relatively few sensors. As an example, an ESP system can include surface sensors that monitor various parameters such as electrical drive frequency, three-phase current, and three-phase voltage. Additional types of surface sensors include surface flow sensors, which can monitor various parameters such as wellhead pressure and temperature.

As to downhole sensors, an ESP system may include sensors that can monitor pump intake pressure and temperature; pump discharge pressure and temperature; and motor oil temperature. Known system parameters and sensor monitored state variables (e.g., pressures and temperatures) tend to be too sparse to allow for practical and reliable calculations of unknown system state variables (e.g., using a forward solution of a system co-simulation).

In an example embodiment, uncertain fluid parameters of fluid density; $\rho$, dynamic viscosity, $\mu$; heat capacity, Cp; and thermal conductivity, k; the uncertain pump internal leakage due to wear, $Q_{leak}$; and unknown state variable of pump flowrate can be estimated using a parameter identification technique of model inversion.

In such an example, measured signals can be ESP drive frequency, drive current, drive voltage, wellhead pressure, pump intake pressure and temperature, pump discharge pressure and temperature, motor oil temperature, and fluid arrival time at the wellhead during ESP start-up as indicated by a rapid change in wellhead pressure. Examples of model equations may define relationships between unknown variables of fluid density, viscosity, heat capacity, thermal conductivity, pump leakage, and pump flowrate and various measured sensor data. In an oil-water flow the fluid variables of density, viscosity, heat capacity, and thermal conductivity can be reduced to functions of oil API gravity and the water cut of the flow.

As an example, a system may provide information as to degradation in performance of one or more pump stages, failure of one or more bearings, etc. As an example, such information may be based at least in part on a mechanical vibrational spectrum of a downhole pump and its interaction with loading of an electrical motor, which can depend on how the pump is mounted. As an example, such information may be based at least in part on assignment of particular resonant modes to one or more sets of bearings in an electric motor, a protector and/or one or more pump stages. As an example, a system can include sensors for making measurements that may be distributed along an electric motor, a protector and/or one or more pump stages. Such information may be used for purposes of state identification, state transitioning, predictive health monitoring, etc.

As an example, a method can include estimating equipment health and predicting life expectancy of one or more components of an ESP system utilizing a model of the ESP system, which may be complimented with downhole measurements such as measurements of motor phase currents and voltages, pressures, temperatures, vibrations, flowrate, fluid composition, etc.

As an example, a method for determining remaining useful life of one or more components of an ESP system may include correlating multiple input signals from sensors at surface as well as downhole sensors, mounted on and around an ESP system, for example, to assess via a model health of an electric motor and/or pump components (e.g., bearings, seals, As an example, a system can include a reception interface that receives sensor data pertaining to production of fluid from a well; an event detection engine that, based at least in part on a portion of the sensor data, outputs an indication of an event; and a control schema engine that, in response to the indication of the event, configures a controller to operate according to a control schema for control of equipment associated with production of fluid from the well. In such an example, the equipment can be or include an electric submersible pump where, for example, sensor data include sensor data of a unit operatively coupled to the electric submersible pump.

As an example, a control schema engine can determine a context of the event. As an example, system can include a graphical user interface where a control schema engine can configure the graphical user interface, for example, where the graphical user interface can include one or more lanes associated with one or more events.

As an example, an event can be indicative of a state of equipment, for example, indicative of a state of the equipment with respect to fluid. As an example, an event can be a low flow event of fluid. As an example, an event detection engine can determine a most probable event from a plurality of different events.

As an example, a method can include receiving sensor data pertaining to production of fluid from a well; detecting an event based at least in part on a portion of the sensor data; and, in response to detecting the event, configuring a controller to operate according to a control schema for control of equipment associated with production of fluid from the well. In such an example, the method can include operating the controller according to the control schema. As an example, equipment can be or include an electric submersible pump. As an example, an event can be a flow related event related to flow of fluid (e.g., via an ESP, etc.).

As an example, a method can include rendering a graphical user interface to a display where, for example, the method can include configuring the graphical user interface in response to detecting an event. As an example, a method can include rendering an indicator to a display that indicates occurrence of an event in real-time.

As an example, a controller can be a state-based controller and an orchestrator can output a control schema that is a state-based control schema. In such an example, the controller can be itself controlled to be operable in a particular controller state. As an example, control schema can be organized according to states where an orchestrator can determine an appropriate state and utilize that determined state to select an appropriate control schema that places the controller in the appropriate control state.

To more fully characterize behavior of an artificial lift system or other resource recovery operation system (e.g., for recovery of hydrocarbons from a reservoir), a computational system can provide multiple components as tools that provide different routes to characterize behavior. For example, consider a computation system that generates a digital twin of at least a portion of an artificial lift system via one or more of learning and physical model-based inversion.

As an example, consider a sensor that outputs data as time series data. In an ESP, such a sensor may be an intake pressure sensor of a gauge while in a rod pump, such a sensor may be a load cell. As to a gas lift system, consider a valve vibration sensor. In such examples, the time series data may include variations of a certain time scale that is not adequately modeled via one or more physical models, particularly in a short period of time (e.g., real-time analysis, etc.). Such time series data may be processed via a learning process such as, for example, an artificial neural network (ANN) that can train an ANN for use in processing data to provide output (e.g., values for one or more state variables). As to some examples of data sampling rates of various sensors, see Table 1.

As an example, an analysis engine that can perform learning may operate as a machine learning (ML) engine. As an example, an analysis engine may operate with respect to an ANN or other type of network. Various neural network learning algorithms (e.g., back propagation, etc.) can implement one or more gradient descent algorithms. As to Bayes net learning in comparison to neural net learning, in Bayes net learning there tend to be fewer hidden nodes where learned relationships between the nodes may be more complex, for example, as a result of the learning having a direct physical interpretation (e.g., via likelihood theory) rather than being black-box type weights, and the result of the learning can be more modular (e.g., portions separated off and combined with other learned structures). As an example, a Bayes approach may be utilized for inversion. As an example, a learning process may or may not have intrinsic meaning. For example, consider concepts of a white box approach and a black box approach where the white box may have some amount of intrinsic meaning whereas a black box can operate without such intrinsic meaning. As an example, a Bayesian network can operate with intrinsic meaning behind its structure; whereas, for example, an artificial neural network can operate without such intrinsic meaning.

An inversion process may be implemented via an analysis engine where the inversion process addresses one or more inverse problems, which involve calculating, from observations, causal factors that produced the observations. For example, consider calculating an image in X-ray computed tomography from X-ray attenuation data (e.g., utilizing an inverse transform), source reconstruction in acoustics, or calculating the density of the Earth from measurements of its gravity field. An inverse problem can start with results and then calculate causes, which is opposite of a forward problem that starts with causes and then calculates results (e.g., consider a forward simulation in time, etc.).

As an example, an analysis engine can include one or more features of the APACHE STORM™ engine (Apache Software Foundation, Forest Hill, Maryland). As an example, a method can include implementing a topology that includes a directed acyclic graph. For example, the APACHE STORM™ application can include utilization of a topology that includes a directed acyclic graph (DAG). A DAG can be a finite directed graph with no directed cycles that includes many vertices and edges, with each edge directed from one vertex to another, such that there is no way to start at any vertex v and follow a consistently-directed sequence of edges that eventually loops back to v again. As an example, a DAG can be a directed graph that includes a topological ordering, a sequence of vertices such that individual edges are directed from earlier to later in the sequence. As an example, a DAG may be used to model different kinds of information. As another example, an analysis engine can include one or more features of the NETICA™ framework (Norsys Software Corp., Vancouver, Canada), which includes features that generate and use networks to perform various kinds of inference where, for example, given a scenario with limited knowledge, appropriate values or probabilities may be determined for unknown variables. As yet another example, an analysis engine can include one or more features of the TENSOR FLOW™ (Google, Mountain View, California) framework, which includes a software library for dataflow programming that provides for symbolic mathematics, which may be utilized for machine learning applications such as artificial neural networks (ANNs), etc.

Figure 4:
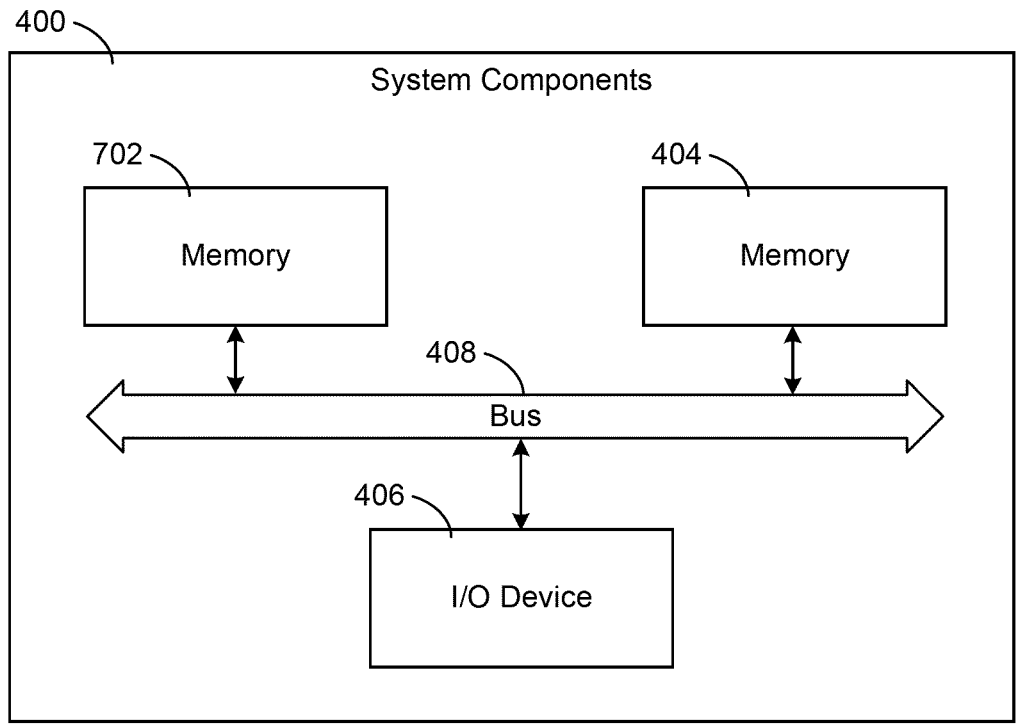
FIG. 4 is a diagram of a system for controlling the ESP of FIG. 2, according to some embodiments.
Figure 4:
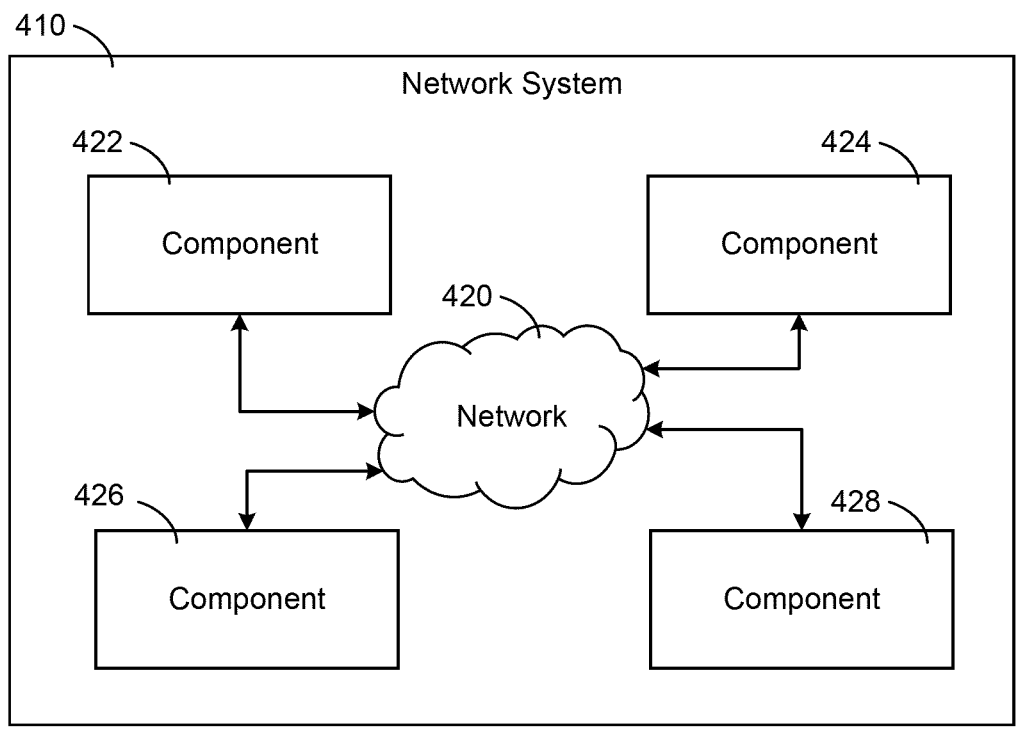

As an example, a component of a computational system can include information (e.g., specifications, settings, model(s), instructions, etc.) that can represent states of operation of equipment. For example, an impeller component can include information as to one or more types of impellers, which can include information such as size, number of blades, angle(s) of blades, surface finish of blades, features of impeller, seal type(s), matching diffusers, material of manufacture, manufacture process, thermal properties, ratings for fluid, ratings for rotational speed, wear characteristics, wear limits, etc. In such an example, the impeller component can provide for a state-based representation of various aspects of one or more impellers that are disposed in a pump section or pump sections of an electric Referring now to FIG. 4, components of a computing system 400 and a networked system 440 are shown, according to some embodiments. The system 400 is shown to include a processor 402, a memory 404, and an input/output (I/O) device 406. In some embodiments, system 400 may have multiple processors, memory or storage components, or I/O devices (e.g., multiple of processor 402, memory 404, or I/O device 406). Each of processor 402, memory 404, and I/O device 406 are communicably coupled to a bus 408. In some embodiments, instructions may be stored in one or more computer-readable media (e.g., memory 404). Such instructions may be read by one or more processors (e.g., processor 402) via a communication bus (e.g., bus 408), which may be wired or wireless. The one or more processors may execute such instructions to implement (wholly or in part) one or more attributes (e.g., as part of a method). In some embodiments, a user may view output from and interact with a process via an I/O device (e.g., I/O device 406). According to an embodiment, a computer-readable medium may be a storage component such as a physical memory storage device, for example, a chip, a chip on a package, a memory card, etc.

In some embodiments, one or more components of system 400 may be distributed among various servers or other system. For example, as shown in network system 410, a network 420 may communicably couple one or more components 422-428. In this example, the components 422-428 may include processor 402, memory 404, or I/O device 406, or other, similar components. In some embodiments, components 422-428 may include components for displaying information relating to system 400 to a user and/or receiving user inputs to system 400 (e.g., a graphical user interface). In some embodiments, network 420 includes the Internet, an intranet, a cellular network, a satellite network, or any other type of network. It will be appreciated by those in the art that network system 410 may include more, or few components (e.g., components 422-428) connected via network 420.

Figure 5:
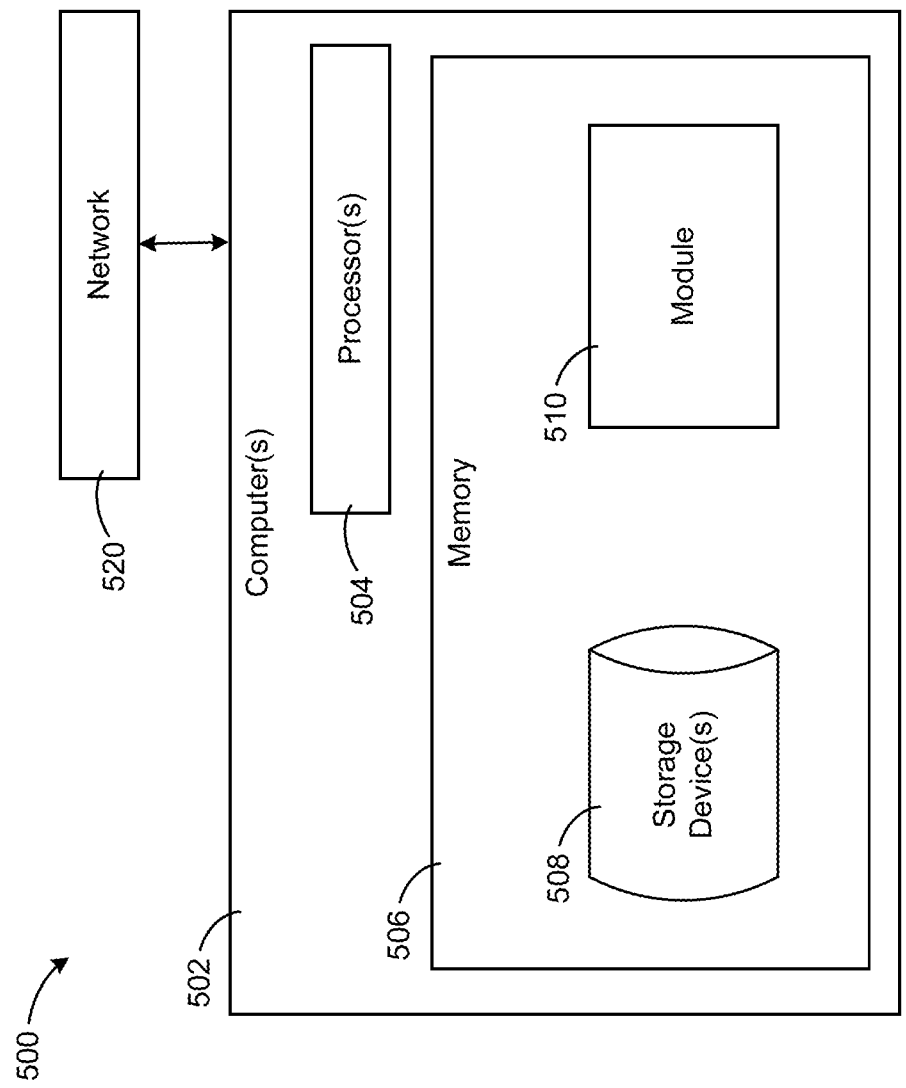
FIG. 5 is an example of a system for controlling the ESP of FIG. 2, according to some embodiments.

Referring now to FIG. 5, an example of a system 500 is shown, according to some embodiments. In some embodiments, system 500 is one of components 422-428, as described above. In other embodiments, system 500 is a part of system 400, or is in communication with system 400 in another manner. For example, system 500 may utilize one or more resources of system 400, such as processor 402, memory 404, or I/O device 406. In some embodiments, a computer 502 of system 500 is communicably coupled to one of system 400, network 420, or bus 408 via a network 520. In some such embodiments, network 520 may be the same network as network 420.

Computer 502 is shown to include a processor 504 and a memory 506. Processor 504 can be implemented as a general purpose processor, an application specific integrated circuit (ASIC), one or more field programmable gate arrays (FPGAs), a group of processing components, or other suitable electronic processing components. Memory 506 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 506 can be or include volatile memory or non-volatile memory. Memory 506 can include database components, object code components, script components, or any other type of information structure for supporting the various activities and information structures described in the present application. According to an example embodiment, memory 506 is communicably connected to processor 504 via computer 502 and includes computer code for executing (e.g., by computer 502 and/or processor 504) one or more processes described herein.

As shown, memory 506 may include a storage device 508. Storage device 508 may be a database, a portioned area of memory 506, an external memory device, or any other component capable of storing and retrieving instructions, methods, or other code for execution by computer 502 and/or processor 504. Memory 506 is further shown to include a module 600, which may be in communication with storage device 508 (e.g., to store or retrieve instructions or methods). Module 600 is described in greater detail below.

Figure 6:
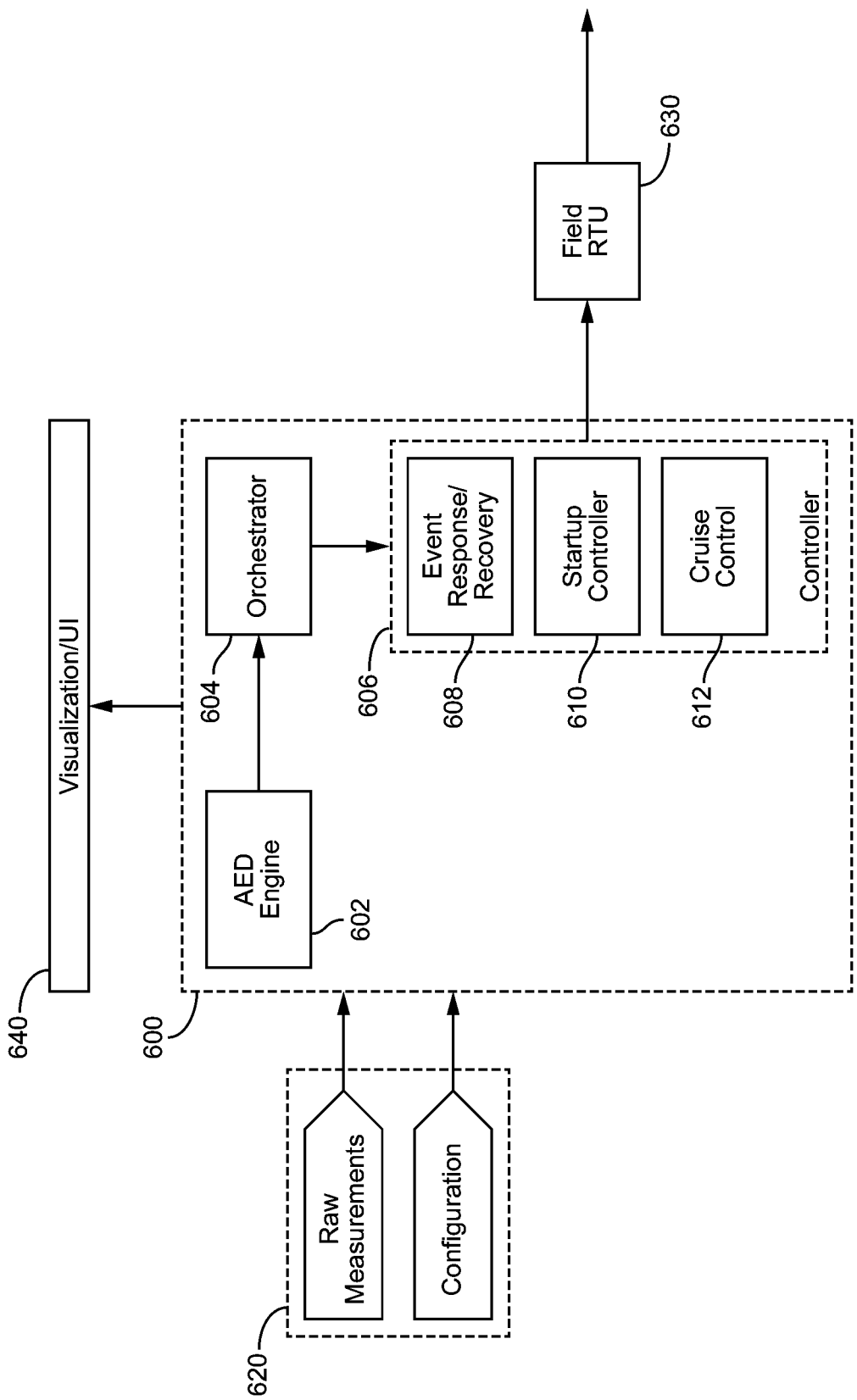
FIG. 6 is a diagram of a module of the system of FIG. 5, according to some embodiments.

Referring now to FIG. 6, a diagram of module 600 is shown, according to some embodiments. As described above, module 600 may be a component of system 500. In this manner, module 600 may be communicably coupled to system 400 via network 520, for example. As shown, module 600 includes an automated event detection (AED) engine 602, an orchestrator 604, and a controller 606, described in detail below.

In some embodiments, AED engine 602 receives inputs 620 via one or more interfaces. For example, inputs 620 may be received from one or more sensors associated with a fluid transfer device or an artificial lift system (e.g., such as an ESP, described above). As described herein, fluid transfer equipment may include any of the equipment described above and/or a progressive cavity pump, a centrifugal pump, a reciprocating plunger pump, a diaphragm pump, a gear pump, a variable position valve, or any other type fluid transfer device. It will be appreciated, however, that AED engine 602 may receive similar inputs 620 from one or more sensors of any drilling, pipeline, or power quality device. In some embodiments, inputs 620 are received via an external interface or network. Inputs 620 may be received via bus 408 (e.g., from I/O device 406) or network 420, for example. After receiving one of raw data or configuration data from inputs 620, AED engine 602 may process the data and output one or more event alarms. In some embodiments, the event alarms are based on a series of severities and probabilities associated with one or more detectors of AED engine 602.

In some embodiments, AED engine 602 may receive inputs 620 of raw data from sensors associated with a fluid transfer device, such an ESP. Based on the received data, AED engine 602 may determine a likelihood (e.g., a probability) that the fluid transfer device may experience a number of known event conditions. Event conditions are generally undesirable conditions that may lead to equipment wear, breakdown, or other damage. Such event conditions may include, for example, gas interference (GI), dead head (DH), pump off (PO), insufficient lift (IL), or any number of other known events for a particular type of fluid transfer equipment.

In an example where sensor data is received from an ESP, AED engine 602 may determine that the ESP has a high likelihood of experiencing a GI condition. In this example, AED engine 602 may determine that the likelihood of the ESP experiencing a GI condition is highest amongst one or more event detectors, and therefore AED engine 602 may raise an alarm. In some embodiments, the one or more event detectors may be associated with event conditions described above. For example, an event detector associated with a GI condition for an ESP may include signal data from the ESP or other identifying features for an ESP experiencing such a condition.

In some embodiments, the event detectors have an associated type (e.g., of event condition) and an associated severity. In such embodiments, a severity associated with an event condition and/or an event detector may be an indicator of an impact the event condition may have on the fluid transfer equipment. For example, a first event condition may cause greater damage or downtime to fluid transfer equipment than a second event condition, so the first event condition may be associated with a higher (i.e., larger) severity. In some embodiments, the severity of the event condition may be determined by comparing identified values of sensor data with expected values of the same sensor data. In other embodiments, the severity may be determined by calculating a how closely an identified event condition matches a predetermined event condition.

In some embodiments, at continuous and/or periodic time intervals, AED engine 602 can produce analog values for the one or more event detectors. The analog values can be used to evaluate the impact of one or more control actions. For example, AED engine 602 may use the analog values to determine the impact of responding to a GI event with a particular corrective action. In this example, responding to the GI event may increase a severity associated with a PO event detector. In some embodiments, AED engine 602 can include circuitry (e.g., programmed or other) that can account for impact(s) of one or more control actions. As mentioned, a system can be layered in a manner that can account for various actions called for with respect to one or more wells, installations of equipment, etc. The operation of AED engine 602 is described in detail below, with reference to FIG. 11.

In some embodiments, module 600 can operate in an event-driven manner. For example, module 600 can be a portion of a control system that includes one or more control schemas that are event-driven. As an example, AED engine 602 can output a most likely event condition or alarm (e.g., a low/no flow condition), and output a likelihood of one or more other events occurring. This output can inform as to a context for the appropriate control actions, where impact thereof can be tracked over time. As an example, feedback received from AED engine 602 (or other source(s)) can be used to guide one or more subsequent actions, for example, possibly adjusting them as appropriate.

In some embodiments, orchestrator 604 receives an output of the AED engine 602, which may include one or more of DQFlags, RefSignals, alarms, etc. Orchestrator 604 may process the output of AED engine 602 to generate an output that can be directed to (e.g., received by) a controller 606. For example, the output may be used to configure, enable, disable, or otherwise control one or more components of the controller 606. Subsequently, controller 606 can output one or more control signals to field equipment, such as a remote terminal unit (RTU) 630. In some embodiments, RTU 630 includes and/or is operatively coupled to one or more pieces of controllable equipment (e.g., a fluid transfer device, an ESP, a valve, etc.). As shown, the RTU 630 can provide for control execution.

In some embodiments, orchestrator 604 operates to contextualize a particular control schema (e.g., of a plurality of control schemas) to activate (i.e., initialize, execute). As an example, a memory or other storage device (e.g., memory 506 and/or storage device 508) can store a plurality of control schemas that can be organized with respect to context (e.g., contextual scenarios, contextual information, etc.). In such an approach, context logic can be utilized to determine a context using inputs and known contextualized and/or contextualizable schemas, to select and/or generate a control schema for implementation. As a control schema can include one or more actions to be performed (e.g., control actions, corrective actions), one or more features of module 600 can determine an impact or likely impact associated with one of the actions or a plurality of the actions, which may relate to an event severity or event severities.

In some embodiments, controller 606 can implement event response and recovery (ERR) 608 in response to an output of orchestrator 604. ERR 608 may include a series of procedural steps whose effects are assessed at each step. In this manner, a severity associated with an event condition of interest may be reduced (e.g., to below a threshold), thus eliminating the alarm (and maintaining this state based on a stability criterion). Such an assessment can benefit from continually tracking the effect to a number of severities to ensure that actions taken do not lead to other undesirable states. As an example, a startup controller 610 can be called upon when starting up an ESP. In such an example, a control schema can be selected and/or generated that optimizes one or more parameters associated with the ESP, such as a speed (i.e., frenzy) and/or choke position, to avoid undesirable events such as Pump Off or Insufficient Lift or Dead Head. In some embodiments, the control schema may be a model predictive control (MPC).

In some embodiments, AED engine 602 functions as an independent assessor or surveyor of a control schema. For example, AED engine 602 can provide various types of information to orchestrator 604 (e.g., dynamically, event by event, etc.), which, in turn, can be used to configure controller 606 (e.g., via one or more selected and/or generated contextualized control schema). In this way, the orchestrator 604 can make the controller 606 more dynamic and responsive to conditions, scenarios, etc. As an example, a cruise control 612 of controller 606 can include features for torque control, which may be activated to mitigate certain event conditions, such as a GI condition, before an effect of the condition (e.g., gas lock) occurs.

In some embodiments, a control schema can include a time-based approach that can be interrupted and/or adjusted dynamically. As an example, a control schema may include an increment size and increment rate by which parameters of a device can be adjusted (e.g., via control signals to equipment). As an example, a rotational speed of a fluid transfer device such as an ESP may be controlled by adjusting an increment size and a number of steps to take over a period of time (e.g., ramping up or down the ESP, oscillating speed via frequency control to a multiphase electric motor of the ESP, etc.).

As an example, orchestrator 604 can select and/or generate a control schema that aims to allow controller 606 to address an undesirable event, which can be a control schema that aims to respond to the event and recover from the event in an acceptable manner, which can be in an expeditious manner that reduces risk of causing another type of undesirable event. For example, drive frequency may be controlled in a manner that addresses the event where the increment size, time between incremental changes, etc., are tailored to conditions such that operation of equipment is not put at an increased risk of damage, as described in detail below.

In some embodiments, a control schema may account for one or more pieces of equipment. For example, a control schema may account for a cable, an MLE, a pump, an intake, a protector, a motor, a gauge, a bearing, an impeller, a diffuser, a wye-point (e.g., imbalance), current leakage, etc. As an example, a control schema may account for what sensors are operable and/or capable of providing sensor data, which may be, for example, through a wye-point of a multiphase electric motor and through a multiphase cable. As an example, AED engine 602 can provide information as to what sensor data may be available for use in control (e.g., feedback). As an example, where AED engine 602 indicates a likely root cause (e.g., as a context), AED engine 602 may provide information as to what sensor data (e.g., time frame, types of sensor data, etc.) were utilized in determining the likely root cause (e.g., most likely or most probable root cause). Orchestrator 604 can then utilize such information in selected and/or generating a control schema.

In some embodiments, regarding procedural schema for module 600, actions (e.g., corrective actions to detected event conditions) are captured and/or compiled over time and used to continuously optimize and improve module 600. For example, based on prior corrective actions, appropriate step sizes for adjusting control signals or parameters of a device (e.g., speed and choke position of an ESP) may be determined, thereby increasing the abilities of module 600 in recovering the device from bad states quickly.

Still referring to FIG. 6, a user interface (UI) 640 is shown communicatively coupled to module 600. In some embodiments, UI 640 is implemented as a webserver that can store, process, and deliver web pages (e.g., HTML documents) to a web browser of a user device, or as an application on a user device (e.g., desktop application, mobile application), for example. UI 640 may generally receive inputs (e.g., HTTP requests) from user device. In some embodiments, UI 640 may display graphical user interfaces to a user and may receive user inputs. UI 640 may display alarm information (e.g., from event conditions detected by AED engine 602), system statuses (e.g., of module 600, RTU 630, or any other connected equipment), or anything other information that enables user access and control over the system.

In some embodiments, one or more features of controller 606 (e.g., ERR 608, startup controller 610, cruise control 612, etc.) can be implemented according to a selected and/or a generated control schema as received by orchestrator 604, based on information received from AED engine 602 where, for example, the control schema may act to configure or customize a graphical user interface (GUI). The GUI may include various types of information (e.g., data, lanes, etc.). In some embodiments, orchestrator 604 can provide for a GUI that may make an operator (i.e., monitor, user) aware of a change in a control schema, aspects of a control schema, etc., which may be responsive to an action or actions of AED engine 602, which is/are responsive to input received by AED engine 602.

Figure 7:
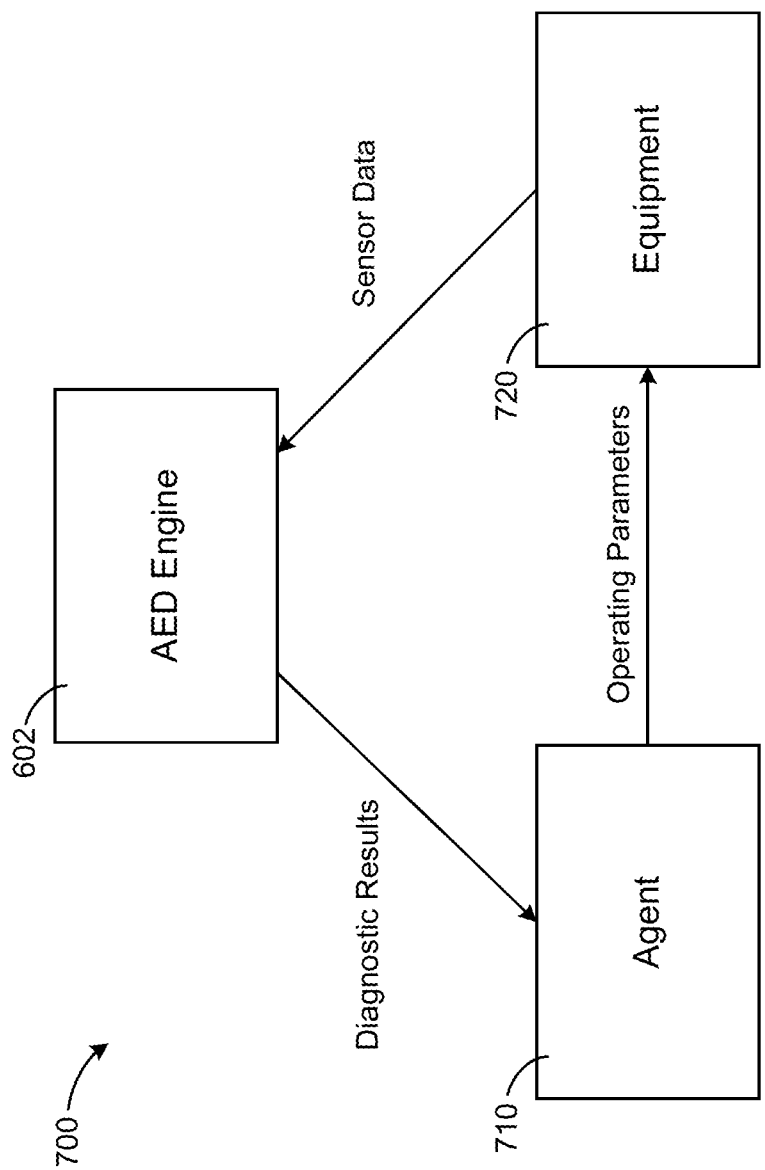
FIG. 7 is a block diagram of a control process, according to some embodiments.

Referring now to FIG. 7, a block diagram of a control process 700 is shown, according to some embodiments. Process 700 may visually represent a control loop, process, or method followed by various components of module 600 and/or system 500, for example. More specifically, process 700 may represent a control loop, process, or method followed by AED engine 602, orchestrator 604, controller 606, and RTU 630. In this example, AED engine 602 may provide data, signals, or other information to an agent 710 that in turn provides data, signals, or other information to equipment 720. Likewise, equipment 720 can provide data, signals, or other information back to AED engine 602.

As shown, agent 710 generally includes components and/or the functionality of components of module 600. For example, agent 710 may include at least a portion of the functionality of orchestrator 604 and/or controller 606. In other words, agent 710 may represent a majority of module 600, where AED engine 602 is a separate component or an external device.

In some embodiments, agent 710 is a dynamic system that can adapt to equipment 720 and to changes within equipment 720. For example, agent 710 may adapt based on a type of equipment 720 (e.g., an ESP) and/or changes to conditions that equipment 720 is operating in (e.g., changes to well conditions). Advantageously, by dynamically adapting to equipment 720, agent 710 may apply appropriate control steps (i.e., generate appropriate corrective actions) for equipment 720. More generally, various types of equipment 720 (e.g., pumps, valves, pipelines, etc.) may require different control actions, and the control actions applied by agent 710 cannot adequately control equipment 720 if the same control steps are applied across all types of equipment 720. In this manner, agent 710 may provide more optimal control over equipment 720 when compared to predetermined or deterministic control frameworks.

In some embodiments, agent 710 may receive an alarm, an indication of an event condition (e.g., an event type and/or severity), or other diagnostic data from AED engine 602. Agent 710 may process the received information to determine a corrective action to apply to equipment 720. As an example, agent 710 may receive an indication that equipment 720 (e.g., a pump) is experiencing low flow due to an IL condition, and therefore may generate a set of parameters for the equipment based on the event condition. In this example, agent 710 may generate a new, higher frequency value and a new choke position (e.g., close the choke) for the pump. The generated corrective action(s) may then be transmitted to equipment 720 and/or used to control equipment 720.

Figure 9:
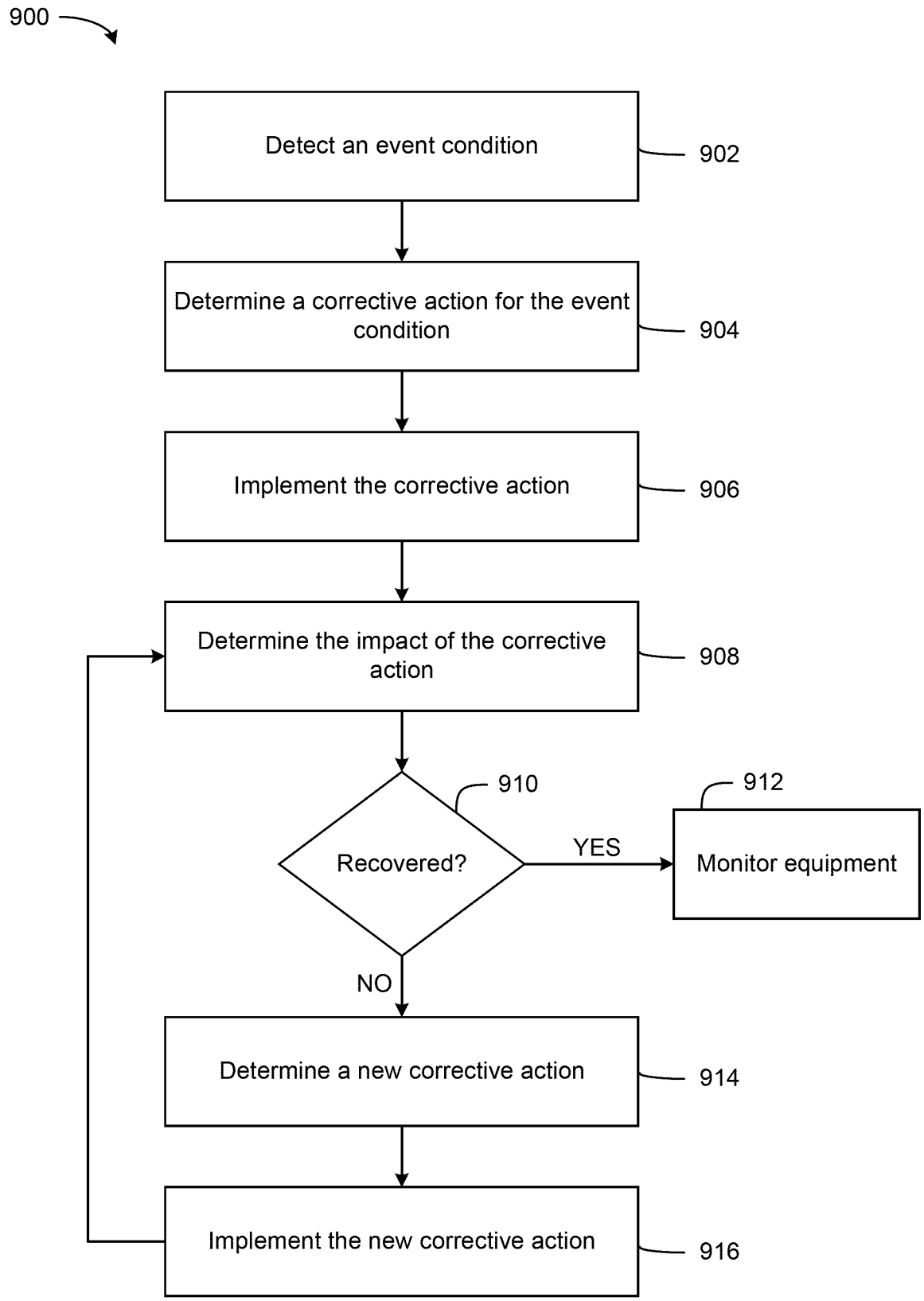
FIG. 9 is a process for automatic event detection and response, according to some embodiments.

Agent 710 may generate the corrective action according to the methods described herein, such as the process of FIG. 9. In some embodiments, after receiving an indication of an event condition from AED engine 602, agent 710 may apply event condition information to a model of the system, or to a type of state engine that may determine the corrective action. In one example, agent 710 may input information about the event condition to a model, where the output of the model is a Gaussian distribution of potential corrective actions (e.g., parameters for the equipment). In some embodiments, agent 710 may adapt to equipment 720 by normalizing reward values across any type of equipment 720 to provide unbiased results.

Agent 710 may select a random potential corrective action from the distribution and calculate a reward value for the random potential corrective action. The reward value is generally an indication of how good a corrective action is, overall. In other words, the reward value may be a measure of goodness of a corrective action. In some embodiments, a corrective action with a positive or large reward value (i.e., high degree of goodness) may be more desirable than a corrective action with a negative or small reward value (i.e., low degree of goodness). In some embodiments, agent 710 may feed the random potential corrective action back through the model to determine future reward values. In some embodiments, agent 710 may select multiple potential corrective actions and calculate rewards for each action. In this way, agent 710 may explore a control space to determine an optimal reward, and thereby an optimal corrective action, for a given event condition.

In some embodiments, agent 710 may determine an impact that a selected corrective action has on the likelihood of other event conditions. For example, agent 710 may determine that, in response to a IL condition, a particular corrective action may help move equipment 720 away from the IL condition but may push equipment 720 closer (i.e., increase the likelihood) to experiencing another condition such as an DH condition. For this reason, agent 710 may determine that the particular corrective action is not ideal, or may calculate a lower reward value for the corrective action, due to the corrective action's negative impact on other event conditions. In this manner, agent 710 is cognizant of the likelihood of triggering other event conditions, thereby avoiding fixing a first event condition just to cause a second event condition.

Following the implementation of the corrective action (e.g., in response to an event condition), AED engine 602 may receive and/or retrieve new data from equipment 720. In some embodiments, AED engine 602 may receive said data from one or more sensors associated with equipment 720, and said data may be received at a regular or predefined time interval. AED engine 602 may process the newly received data in a manner similar to the one described above, and described in greater detail below. From the new data, AED engine 602 may determine a variety of information. For example, whether the event condition has been resolved (i.e., the equipment is no longer experiencing the event condition), whether the event condition has been improved, whether the corrective action has increased a likelihood or severity associated with another even condition, or any other of a variety of information that can be determined from the received data. Based on the processed, new data, AED engine 602 may communicate a new event condition, a new alarm, or other new diagnostic data to agent 710, which repeats the process of determining and implementing a corrective for equipment 720 based on the output of AED engine 602.

In some embodiments, based on the flow described above, AED engine 602 and/or agent 710 is a self-learning system. For example, the system may learn over time (e.g., as more event conditions are identified or discovered), to optimize the system response to event conditions. In such embodiments, AED engine 602 and/or agent 710 may learn from previously received data and/or previously implemented corrective actions and store associated equipment responses and/or reward data for future reference. For example, AED engine 602 and/or agent 710 may determine that a given corrective action produced a positive (i.e., high degree of goodness) reward or resolved an event condition, and may repeat the known-good corrective action if the equipment experiences a similar event condition in the future. Likewise, AED engine 602 and/or agent 710 may be able to respond more quickly to future event conditions and/or may prevent future event conditions by repeating the corrective action. As an example, a system controlling and monitoring a valve may optimize how the valve is operated over time, by learning how much to open or close the valve, how fast an open-close cycle should be, etc., in response to an event condition.

Figure 8:
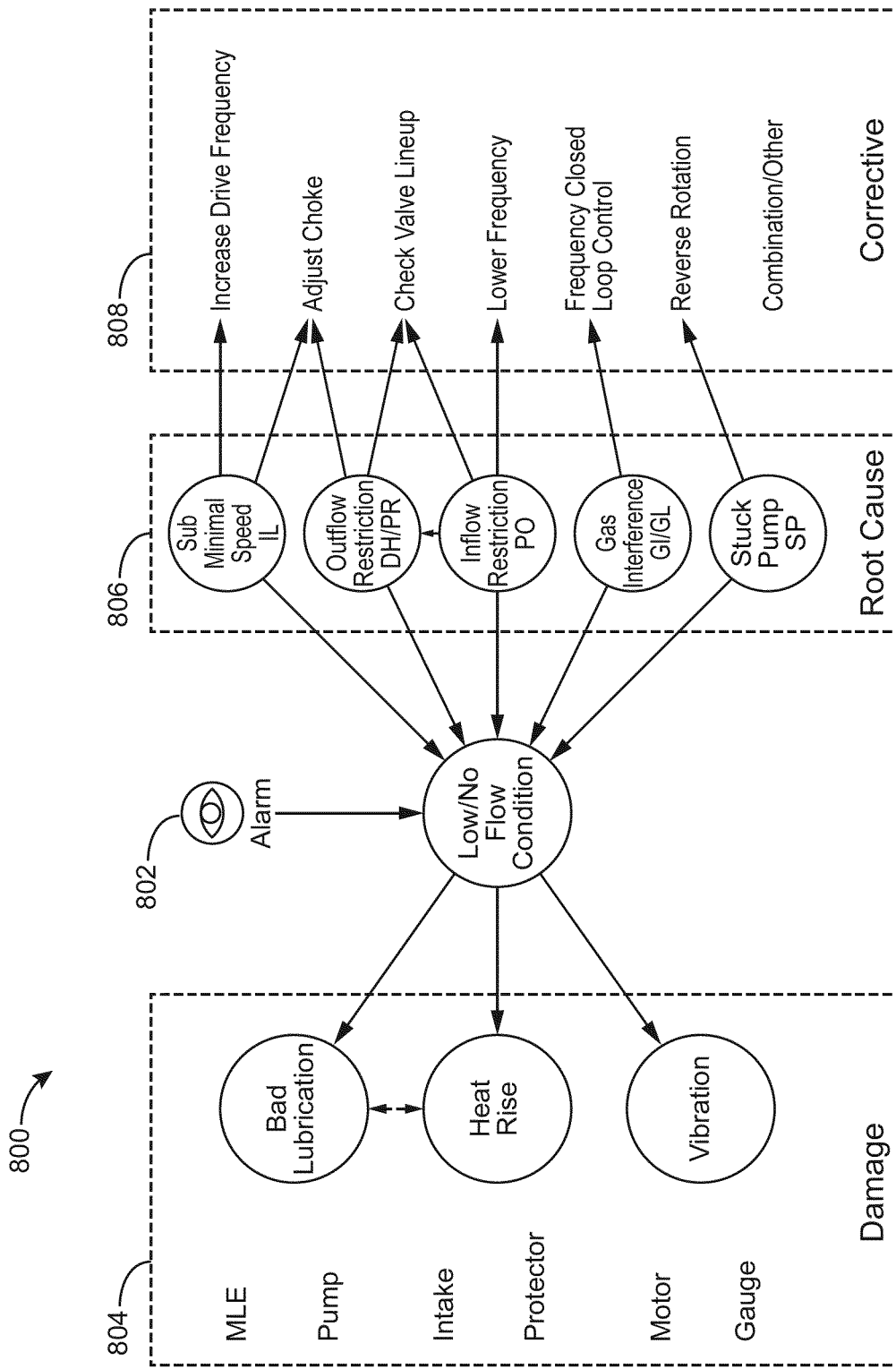
FIG. 8 is an example architecture of an automated event detection and response process, according to some embodiments.

Referring now to FIG. 8, an example architecture 800 of an automated event detection and response process is shown, according to some embodiments. Architecture 800 may be an example of an automated event detection and response process followed by one or more components of system 500, such as module 600, for example. In some embodiments, architecture 800 may be utilized by an automation system for enhanced recovery, where such an automation system is used in artificial lift technology. In such embodiments, architecture 800 can be utilized in one or more production oilfield automation systems and/or optimization systems (e.g., where oilfield can be a field with oil, gas and/or oil and gas, or can be generally a hydrocarbon field).

As shown, visualizations of damage to equipment (e.g., an ESP or other fluid transfer device), various possible root causes of said damage, and remedial actions to take based on a determined root cause are shown. In some embodiments, one of more of said visualizations can be presented as graphical user interfaces (GUIs), displayed via UI 640. In some embodiments, said GUIs may be rendered via execution of instructions by one or more processors of the system 500. Dynamic conditions, such as those illustrated in FIG. 8, can occur based on changes in reservoir or well conditions or operations, for example. In such circumstances, one or more actions can be taken to manage a situation, for example, to achieve one or more objectives (e.g., protecting the equipment or reservoir, or reducing the risk of unplanned shutdowns and production loss).

In some embodiments, an alarm 802 may be issued by an automated event detector, such as AED engine 602. Alarm 802 may indicate a particular condition or conditions being experienced by equipment associated with a system utilizing architecture 800 (e.g., system 500), such as a fluid transfer device. As shown, for example, a pump may be experiencing a low/no flow condition. In this example, the low/no flow condition may be associated with one or more types of damage 804 to the equipment. In this case, the low/no flow condition may lead to poor lubrication of pump components and undesired vibrations. In turn, these effects may raise the temperature of the pump, leading to further damage. In some examples, high operating temperatures, bad lubrication, and vibration, together or independently, may lead to increase wear and/or equipment failure (e.g., pump burn out).

To avoid costly repairs and/or down time associated with equipment failure and damage, AED engine 602 may determine a root cause for alarm 802. As shown, for example, root causes 806 for a low/no flow condition in an ESP may include sub-minimal speed, outflow restriction, inflow restriction, GI, or stuck pump. In some embodiments, any number of root causes 806 may be determined or identified based on an alarm condition. In some such embodiments, root causes 806 may be determined, in part, based on equipment associated with a system utilizing architecture 800 (e.g., system 500). For example, an ESP may experience a number of particular alarms 802, and therefore root causes 806, that are different than other fluid transfer devices.

In some embodiments, each of the root causes 806 may be associated with an event condition. For example, sub-minimal speed may be associated with an IL condition, whereas inflow restriction may be associated with a PO condition. In this manner, each of the root causes 806 may have one or more corrective actions 808 that can be implemented (e.g., by module 600). As shown, for example, a root cause of sub-minimal speed due to an IL condition may be corrected by increasing a drive frequency and/or adjusting a choke of the pump. In another example, a stuck pump may be corrected by reversing a rotation of the pump. In other examples, a root cause may be corrected by any number of corrective actions such as increasing/decreasing drive frequency, adjusting a choke (e.g., a valve at a wellhead, etc.), checking a valve lineup, drive frequency closed-loop control, and/or reversing rotational direction of impellers of a pump.

Referring now to FIG. 9, a process 900 for automatic event detection and response is shown, according to some embodiments. Process 900 may be performed by system 500 and/or module 600, for example. In some embodiments, a portion of process 900 is performed by each of AED engine 602, orchestrator 604, and/or controller 606, described above. In some embodiments, process 900 may be performed by any controller configured to automatically detect events in equipment and implement corrective actions for the equipment based on the detected event. For example, process 900 may be implemented by a controller of an artificial lift system or other fluid transfer device.

At step 902, an event condition is detected. In some embodiments, the event condition is detected by AED engine 602. In some such embodiments, AED engine 602 may raise an alarm, a flag, or otherwise indicate the event condition. Generally, an event condition is detected by AED engine 602 based on data received from one or more sensors associated with one or more fluid transfer devices or equipment. As an example, AED engine 602 may monitor inputs 620 by processing the data according to architecture 800, described above.

In some embodiments, AED engine 602 can detect multiple event conditions simultaneously. In some such embodiments, AED engine 602 may instantiate multiple alarms or indicate the multiple event conditions. For example, AED engine 602 may identify multiple event conditions for a common set of equipment (e.g., a single ESP, etc.), an event condition for each of multiple different sets of equipment (e.g., multiple ESPs in one well or multiple different wells), multiple event conditions for equipment in a common field (e.g., producing from a common reservoir), etc.

In some embodiments, an event condition is detected based on pattern recognition. In such embodiments, data or signals from one or more sensors associated with a fluid transfer device or equipment may follow a known pattern associated with an event condition. For example, in a GI event condition, one or more signals or data received from sensors associated with an ESP experiencing the event condition may match or at least partially match previously determined signal or data patterns for another ESP experiencing a similar GI event condition. In this manner, an event may be detected in a similar manner to an experienced user identifying an event condition by monitoring patterns of data from sensors associated with equipment. In some embodiments, the event condition is detected by any other method described in the present disclosure. In some embodiments, an event condition may be detected by the methods described in U.S. Pat. No. 10,385,857, issued Aug. 20, 2019 and incorporated by reference herein.

In some embodiments, an event condition is generated by comparing one or more sensor signals or data to corresponding expected values. For example, a received sensor signal associated with an ESP may be compared to an expected value (e.g., predetermined, historical, etc.) for the same sensor signal. A match between the received signal and the expected signal may indicate that the ESP is functioning correctly, whereas a difference between the received signal and the expected signal may indicate that the ESP is experiencing an event condition, or may experience an event condition in the near future.

In some embodiments, a variety of event conditions may be known or previously defined. As described above, for example, a fluid transfer device such as an ESP may experience a number of known event conditions (e.g., GI, IL, PO, etc.). In other embodiments, new event conditions may be identified over time (e.g., during operations of equipment), such as by identifying patterns and associated event conditions. In either case, known or otherwise identified event conditions may be associated with a model (e.g., a neural network). In some embodiments, AED engine 602 may utilize said event condition models to identify an event condition.

As an example, AED engine 602 may include, retrieve, or otherwise a plurality of models for any number of event conditions. AED engine 602 may pass unprocessed (i.e., raw) or post-processed data (e.g., input data from sensors) through each of the models associated with the event conditions. In this example, each of the models may return at least one of a likelihood or a severity associated with the event condition, where the likelihood indicates a likelihood that equipment associated with the input data is experiencing the event condition. AED engine 602 may compare the outputs of each of the models to determine a most likely, or most severe event condition. In some such embodiments, each of the models for the event conditions may be any type of model or neural network including, but not limited to, feedforward, multilayer perceptron, radial basis function, etc. In other embodiments each of the models may be any type of regression or data-driven model.

At step 904, a corrective action is determined or generated in response to the event condition. The corrective action may be determined by orchestrator 604 or agent 710, for example. In some embodiments, as described above, an orchestrator (e.g., orchestrator 604) may utilize context logic to determine a context using inputs and known contextualized and/or contextualizable schemas to select and/or generate a control schema for implementation. For example, orchestrator 604 may determine a corrective action based on the identified event condition. In some embodiments, the corrective action may be determined based on a predetermined, initial, or historic policy. Table 2, below, shows an example of an initial policy that may indicate a corrective action(s) to take in responses to certain event conditions experienced by an ESP.

TABLE 2

Example Initial Policies

| Event Condition | Pump Drive Frequency | Choke Position |
| --- | --- | --- |
| Dead head (DH) | Decrease | Open |
| Pump Off (PO) | Decrease | Close |
| Insufficient Lift (IL) | Increase | Close |
| Gas Interference (GI) | Increase | Close |

In some embodiments, a corrective action is generated by a model (e.g., of a system and/or equipment). The model may be a neural network including any type of single or multi-level neural network model, architecture, or topology (e.g., perceptron, feed forward, radial basis, etc.) that receives a type of event condition, as identified at step 902, and, in some cases, a severity associated with the event condition. In such embodiments, the neural network may process the type and severity inputs to determine an output, where the output is a Gaussian distribution of one or more control parameters associated with the equipment and/or the event condition. In an example where a GI event condition is identified for an ESP, for example, the model may output a Gaussian distribution of at least one of a frequency change or a choke position change for the ESP, where a magnitude (e.g., step size) and direction of the changes are the corrective action.

In some such embodiments, generating a corrective action, including changes to one or more parameters of fluid transfer equipment, may be a stochastic process, where the corrective action is randomly sampled from the output of the model. To continue the previous example, at least one of the frequency change or the choke position change for the ESP may be randomly selected from the Gaussian distribution output by the model. In this manner, a plurality of possible control actions and their associated impacts may be explored, to find a best possible set of control parameters. For example, the various generated output parameters (e.g., frequency and choke position) may be fed pack into the model and used to generate new outputs, limiting the overfitting possibility of the model. The generation of a corrective action using a neural network or model is discussed in greater detail below.

In some embodiments, determining or generating the corrective action includes determining or calculating a reward value for each potential corrective action. For example, a model may generate a plurality of potential corrective actions and/or may randomly select multiple potential corrective actions from the Gaussian distributions of control parameters. For each potential corrective action, a reward value may be determined. Based on the reward values, a particular corrective action may be selected for implementation at step 906. For example, the reward value for multiple corrective actions may be compared, and a particular corrective action with a positive or largest reward may be selected.

In some embodiments, both past rewards and future rewards for one or more corrective actions are considered when determining a corrective action. For example, agent 710 (e.g., implementing process 900) may analyze past rewards associated with a particular corrective action (e.g., for a particular event condition) to aid in determining a future event condition. In another example, a plurality of future rewards may be determined, such as by determining a reward value for potential future corrective actions if a current corrective action is implemented. In some embodiments, a particular corrective action may not have a large or positive reward initially, but the particular corrective action may lead to a large or positive reward over time.

At step 906, the corrective action is implemented. In some embodiments, the corrective action is implemented by controller 606, where controller 606 controls RTU 630 and/or updates one or more parameters of RTU 630. In other embodiments, controller 606 or another controller or system controls one or more fluid transfer devices or equipment (e.g., pumps, valve, artificial lift systems, pipelines, etc.) according to the corrective action. For example, a controller (e.g., controller 606) may send a command signal, updated parameters, or other data to a controller of a pump (e.g., an ESP), thereby causing the controller of the pump to increase/decrease a drive frequency of the pump, open or close a choke associated with the pump, or any number of other corrective actions. In some embodiments, system 500 and/or controller 606 may be capable of controlling equipment (e.g., RTU 630) directly. In such embodiments, RTU 630 may be controlled in accordance with the corrective action. In another example where the corrective action indicates that a valve (e.g., of a pump or pipeline) should be closed, controller 606 may control the corresponding valve by closing the valve a specified amount (e.g., according to a number and size of steps).

At step 908, the one or more sensors associated with the fluid transfer equipment are monitored to determine the impact of the corrective action. AED engine 602 may monitor the one or more sensors associated with the equipment being operated according to the corrective action, for example. In some embodiments, data from the one or more sensors may be processed and/or analyzed in a manner similar to step 902, to identify any new or existing event conditions. In this manner, the sensor data is monitored after the equipment operates for a specified time interval according to the corrective action. For example, the data from the sensors may be analyzed immediately after applying the corrective action, or after a time interval (e.g., one minute, five minutes, thirty seconds, etc.).

In some embodiments, a reward value for the corrective action is also calculated at step 908. The reward value may be used for reinforcement learning (RL) of the system. As discussed in greater detail below, reinforcement learning may allow an agent or system (e.g., system 500, module 600, and/or agent 710) to evaluate and update event condition response (e.g., corrective action) policies. For example, a generated corrective action that has a positive or large reward value (e.g., when compared to an initial, baseline, or previous reward value) may be identified as a "good" corrective action that the system will repeat or reuse the future for similar event condition. When a reward value is negative or small, the associated corrective action may be identified as "bad", and the system may choose another corrective action and/or avoid using the "bad" corrective action in the future.

In some embodiments, the reward value is calculated using a multi-dimensional state engine. In such embodiments, the reward value may be based not only on the implemented corrective action, but the impact that the corrective action has on the likelihood of other event conditions. For example, a particular corrective action may produce a good reward for a first event condition, even moving the equipment away from the first event condition, but may increase the likelihood that the equipment experiences a second, different event condition. In this example, the reward value for the particular corrective action may be reduced, as the corrective action has a negative impact on other event conditions. In this manner, an agent (e.g., agent 710) or system implementing process 900 may avoid fixing a first event condition only to cause another.

At step 910, an AED engine (e.g., AED engine 602) determines whether the fluid transfer equipment has recovered from the event condition, based on the monitored sensor data. AED engine 602 may identify any number of event conditions in a similar manner to step 902, for example. In some embodiments, AED engine 602 may compare sensor data (e.g., after being processed by a model) to determine if the sensor data has improved from an initial measurement (e.g., prior to the corrective action). In some embodiments, AED engine 602 compares a severity associated with the previously identified event condition to a currently determined severity, where a decrease in the severity value may indicate that the equipment is recovering from the event condition. In the event that AED engine 602 determines the event condition has been recovered from, the process may continue to step 912, where AED engine 602 and/or a system (e.g., system 500) continues to monitor and/or process sensor data to detect other, future event condition.

In the event that the AED engine determines that the event condition persists, process 900 may continue to step 914. At step 914, a new corrective action is determined or generated. In this regard, step 914 is similar to step 904, described above. Unlike step 904, however, the corrective action determined or generated at step 914 may be based, in part, on the original corrective action determined at step 904. For example, based on the impact of the original corrective action, the new corrective action may be similar or different in magnitude, direction, or another parameter.

In some embodiments, where the impact of the original corrective action is negative (e.g., the reward value is negative, the severity of the event condition increase, etc.), the new corrective action may differ greatly from the original corrective action. For example, if the original corrective action included increasing a drive frequency and/or opening a choke, and the impact of the original corrective action was determined to be negative (e.g., the reward was negative), then the new corrective action may include decreasing the drive frequency and/or closing the choke. In a similar manner, where the impact of the original corrective action is positive (e.g., the reward value is positive, the severity of the event condition decreases, etc.), the new corrective action may be similar to the original corrective action. For example, if the original corrective action included increasing a drive frequency and/or opening a choke, and the impact of the original corrective action was determined to be positive (e.g., the reward was positive), then the new corrective action may include further increasing the drive frequency and/or further opening the choke.

At step 916, the new corrective action is implemented, generally in a manner similar to that of step 906. After implementing the new corrective action, process 900 may continue to step 908, where the impact of the new corrective action is determined. In this manner, the impact of the new corrective action can be determined, to determine whether the new corrective action is positive (e.g., continuing to improve the event condition, improving the event condition compared to the original corrective action). In some embodiments, step 908 through step 916 may be repeated until the equipment recovers from the event condition, the severity of the event condition is reduced (e.g., to below a threshold), or until another, more severe event condition is detected.

In some embodiments, multiple instances of process 900 may be implemented that are in parallel, in series, in parallel and in series, etc. For example, each alarm or event condition detected may cause the instantiation of objects for execution of instructions to perform process 900 for a corresponding alarm/event condition. In some embodiments, a schema framework may include an application programming interface (API) for receipt of calls where the schema framework may process calls in a coordinated manner. For example, a schema framework may receive two calls from two alarms as to two instances of process 900 being executed, in such an example, the schema framework may respond to one or both of the calls with a schema that aims to address the two calls (e.g., underlying root cause or causes of the two alarms). For example, consider architecture 800 of FIG. 8, where at least a portion of the root causes are related and/or associated with a common remedial action(s). Additionally, note that heat rise and bad lubrication may be related, which may be a relationship that can be leveraged by a schema framework (e.g., a schema engine).

Figure 10:
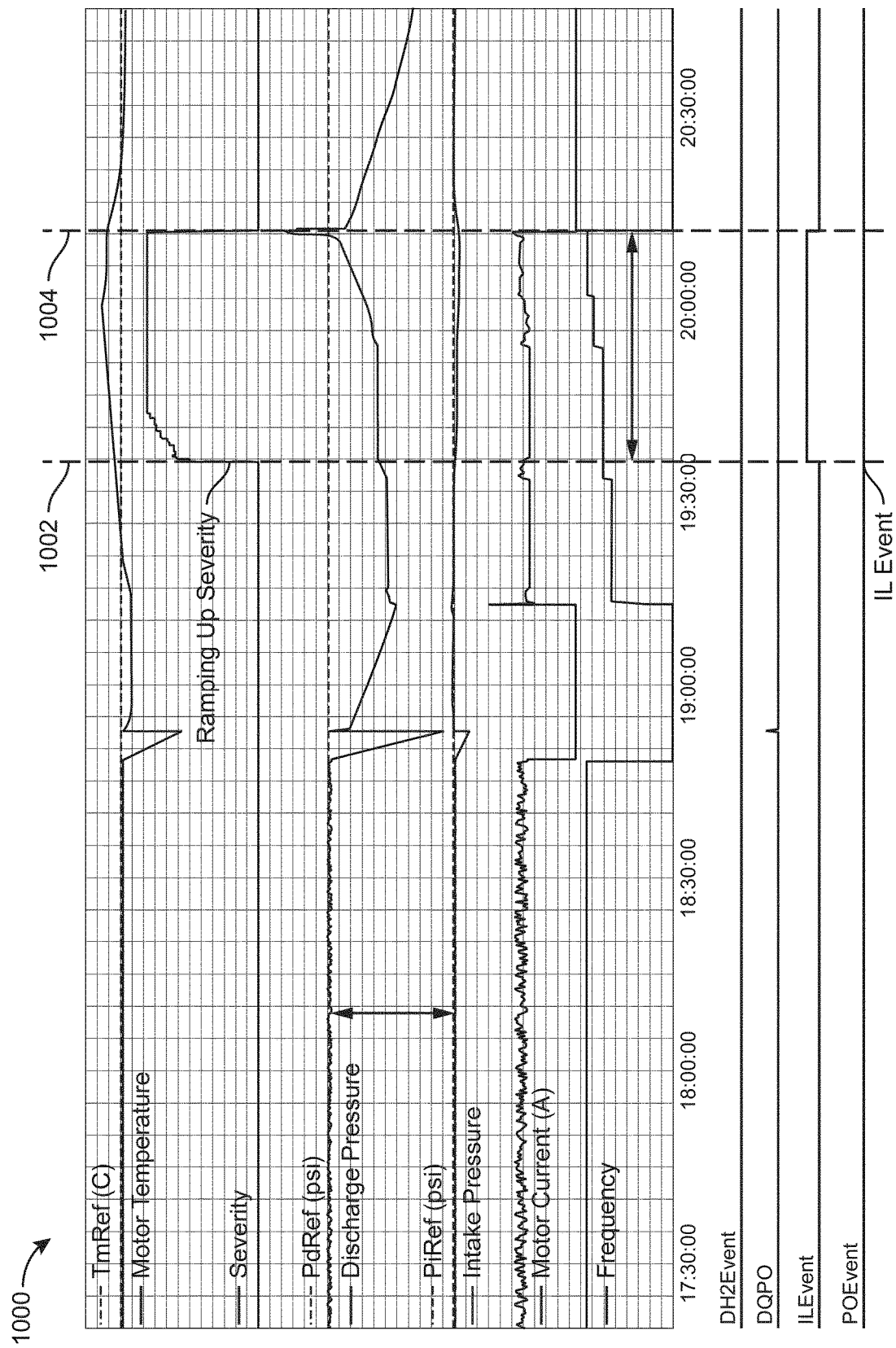
FIG. 10 is an example graph showing a response to an insufficient lift (IL) event condition, according to some embodiments.

Referring now to FIG. 10, an example graph 1000 showing a response to an insufficient lift (IL) event condition is shown, according to some embodiments. Graph 1000 may be example of a GUI that may be presented to a user, for example. In some embodiments, graph 1000 is an example of a response of a system (e.g., system 500 and/or module 600) to an IL condition. For example, graph 1000 may represent values from one or more sensors associated with fluid transfer equipment that is controlled by system 500 and/or module 600. Graph 1000 can be provided on a user interface of a computer, a mobile device, a control panel, or a display.

The example values of graph 1000 pertain to an example IL event condition, where a severity associated with the event condition is displayed is after an AED engine (e.g., AED engine 602) has evaluated probabilities and severities for one or more event detectors. In this regard, graph 1000 may illustrate the system response after AED engine 602 restricts an output (e.g., of an alarm or an event condition) to a single outcome. As shown, for example, AED engine 602 may have processed data from a plurality of sensors and determined, based on the sensor data, that the equipment associated with the sensors is experiencing a IL event condition.

As shown, data graphics (i.e., graph lines) are shown for a number of different types of event conditions considered by AED engine 602. In this example, said lines include a dead head outcome lane (DH2Event), a data quality related pump off outcome lane (DQPO), an IL outcome lane (ILEvent) and a PO event outcome lane (POEvent). As described above with respect to process 900, AED engine 602 may determine that equipment is experiencing a particular condition, and determine a severity associated with the identified condition. At marker 1002, for example, an IL event is identified. In this example, AED engine 602 may output an alarm or other indicator of the IL condition, as shown by the rise in the "ILevent" line of graph 1000.

In some embodiments, a severity may be determined by AED engine 602 for each of the considered event conditions. In the previous example, where an IL condition is determined, a severity associated with the IL condition may have risen about a threshold value, causing AED engine 602 to determine that the IL event is a "most likely event" (i.e., that the IL event condition is most likely to occur when compared to the other possible event conditions). In this case, the "ILevent" line increases from a baseline value, indicating an alarm (marker 1002).

As shown in graph 1000, upon AED engine 602 issuing an alarm (e.g., that an IL event condition is detected or imminent), an orchestrator (e.g., orchestrator 604) receives an indication of the IL event alarm (e.g., event type, time, associated information as to context) and selects and/or generates a control schema that can address the event, as described above. For example, a control schema may be selected and/or generated and utilized to effectuate control by a controller (e.g., controller 606) such that the IL event condition may be avoided and/or corrected (e.g., where such an action aims to reduce risk of damage, etc.). In the example of graph 1000, the IL event condition is shown to persist until the equipment is controlled to be in an "off" state, as indicated by the drop in the pump frequency to approximately zero (at marker 1004).

Figure 11:
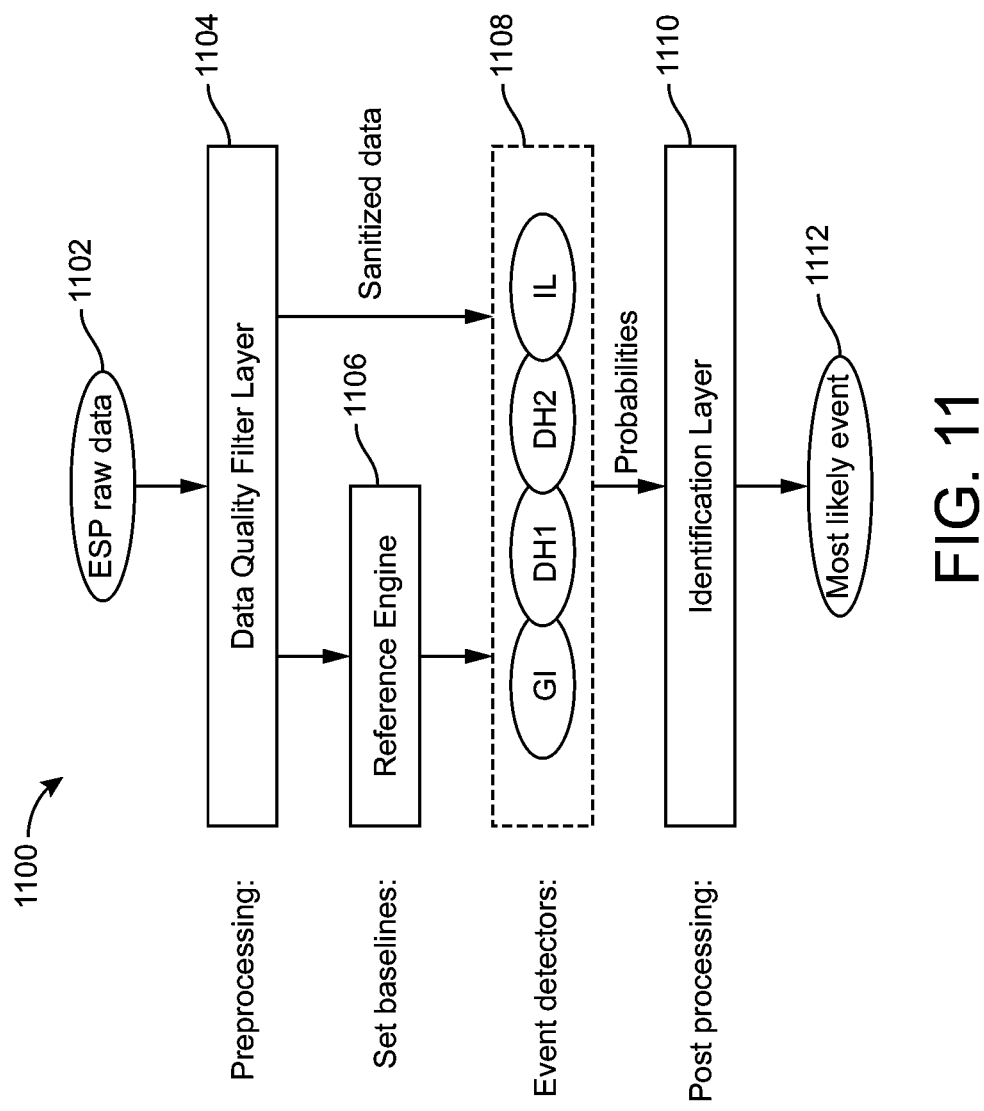
FIG. 11 is a data structure implemented by an automated event detection engine, according to some embodiments.

Referring now to FIG. 11, a data structure 1100 implemented by an automated event detection engine (e.g., AED engine 602) is shown, according to some embodiments. Data structure 1100 may be implemented by AED engine 602, for example. In some embodiments, AED engine 602 contextualizes one or more inputs received from one or more sensors associated with fluid transfer equipment to determine a potential event condition. For example, based on received data (e.g., in real-time or near real-time), AED engine 602 may contextualize event that are occurring within the equipment (e.g., a well, a fluid transfer device). In this manner, AED engine 602 may contextualize received data to determine a cause for an event condition.

As shown, AED engine 602 may receive raw data 1102, generally from one or more sensors associated with a fluid transfer device such as an ESP. The raw (i.e., unprocessed) data may be preprocessed at a data quality filter layer 1104. Data quality filter layer 1104 may be configured to convert the received data into another format, for example, to be processed by AED engine 602. In some embodiments, data quality filter layer 1104 may also parse and/or sort the raw data for further processing.

From the preprocessed data, baselines can be generated. In some embodiments, baselines may be generated or determined by a reference engine 1106. Reference engine 1106 may include and/or communicate with a database that includes one or more baseline values for each of the received data types. For example, if a motor drive frequency measurement is received for an ESP, reference engine 1106 may determine a standard or expected dataset for comparing the received data with. In some embodiments, the datasets referenced or retrieved by reference engine 1106 may be previously generated based on known or previously compiled data sets for similar equipment (e.g., a similar ESP).

In some embodiments, the preprocessed data and/or baselines from reference engine 1106 may be further processed by event detectors 1108. As described briefly above, and below in further detail, each of event detectors 1108 may be a model or other detector for a known or otherwise identified event condition. As shown in FIG. 11, for example, a data structure 1100 for processing data from an ESP may include at least GI, IL, and DH event detectors. In some embodiments, where each of the event detectors 1108 are models of a corresponding event condition, the preprocessed/sanitized data may be an input to the event detector model. In such embodiments, the output of the event detectors 1108 may be a likelihood that equipment associated with the input data (e.g., the ESP) is experiencing, or is likely to experience an associated event condition. In some embodiments, each of the event detectors 1108 may also output a severity associated with the event condition and/or likelihood.

An identification layer 1110 may receive the outputs of each of the event detectors 1108 and determine, based on the outputs, a most likely or most probable event condition that the equipment is experiencing. In some embodiments, identification layer 1110 is configured to compare the likelihood and severity of each of the event conditions (i.e., detector outputs) to determine the most likely event. In some embodiments, the most likely event is the output of AED engine 602. For example, the most likely event may be used to determine a corrective action (e.g., by orchestrator 604). In some embodiments, identification layer 1110 may also output a corresponding event condition severity for the identified "most likely" event condition.

In some embodiments, all of the information described above with reference to FIG. 11 may be considered when determining or calculating a reward for a corrective action. In this manner, a system (e.g., system 500, agent 710) may determine an impact that a particular corrective action for a first event condition has on other event conditions. For example, a determination may be made as to whether the first corrective action may push equipment closer to experiencing another event condition (e.g., of a same or different type). More generally, the system may determine an impact that a corrective action has on increasing or decreasing the likelihood (i.e., likelihood) of other event conditions.

Figure 12:
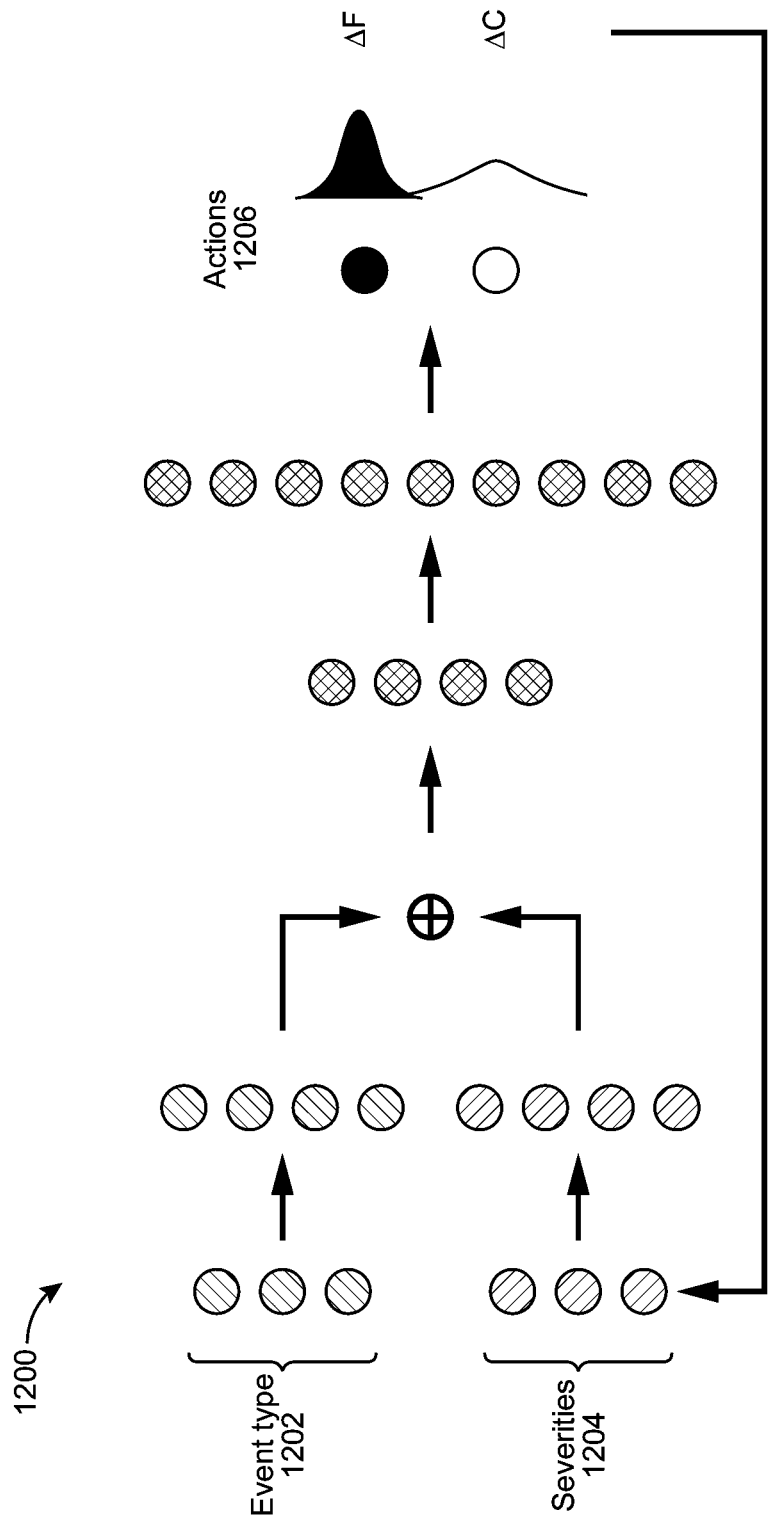
FIG. 12 is an example architecture of a control agent, according to some embodiments.

Referring now to FIG. 12, an example architecture of a control agent is shown, according to some embodiments. The example architecture may be represented by a model 1200, as shown in FIG. 12, for example. In some embodiments, the control agent may include at least a portion of a system for automated event detection and response, such as at least a portion of system 500 or module 600. In some embodiments, the agent may be similar to agent 710, described in detail above. In some embodiments, one or more outputs of AED engine 602 may be fed or communicated to an agent that includes model 1200, where the outputs of AED engine 602 are the inputs to model 1200.

As shown, model 1200 is a multi-layer neural network. Model 1200 may be any type, topology, or architecture of a multi-layer neural network, including but not limited to, perceptron, feed forward, radial basis, recurrent, deep feed forward, etc. In some embodiments, an event type 1202 is fed into model 1200 for processing. The event type may include a type of event condition determined to be "most likely" to be occurring, as determined by AED engine 602. In general, any of the event types described above may be an input to model 1200. For example, at least one of a GI, PO, IL, or DH event type may be input as event type 1202. Based at least on an event type 1202, model 1200 may determine one or more potential corrective actions 1206.

In some embodiments, severities 1204 associated with event type 1202 may also be included as an input to model 1200. In this manner, both event type 1202 and associated severities 1204 may be used to determine potential corrective action 1206. As described above, the potential corrective action 1206 may be a Gaussian distribution(s) of control parameters for associated equipment. As shown in model 1200, for example, output actions for an ESP may include a distribution of potential frequency changes, AF, and potential choke position changes, AC. In such embodiments, AF may indicate a change in drive frequency and AC may indicate a choke control step size and direction. In some embodiments, a particular corrective action may be randomly sampled from AF and AC.

In some embodiments, a randomly selected potential corrective action 1206 may be fed back through model 1200. In this manner, model 1200 may continue to determine potential corrective actions, exploring a control space to determine an optimized set of parameters (e.g., potential corrective actions 1206). Model 1200 may explore the control space to determine an optimized or best corrective action. Model 1200 also generates variations of parameters (i.e., potential corrective actions 1206) and, by feeding potential corrective actions 1206 back through the model, leading to further variations in potential corrective actions 1206. This may be crucial in limiting the overfitting possibility of model 1200. Additionally, model 1200 may be trained using domain expert, historical, or other predetermined data to avoid overfitting, as described below with respect to FIG. 13.

In some embodiments, a determined or generated corrective action may be subject to a constraint. In such embodiments, the constraint may prevent model 1200 (e.g., and thereby system 500 or agent 710) from selecting a corrective action that differs significantly from a previously implemented corrective action, or from an original set of operating parameters, which may cause undesirable conditions. In other words, the constraint may ensure that a selected corrective action does not differ too greatly from previous parameters in magnitude, direction, etc. For example, if a corrective action includes a change to a frequency parameter of a pump, the change to the frequency may be limited to +1 hertz rather than +10 hertz, which may damage the pump. In this manner, the constraint limits the possibility that the parameters of a randomly selected or generated corrective action are too far from previously implemented parameters, which could potentially lead to equipment damage, due to the fact that large changes in parameter values may lead to large error values, which may not be acceptable or desirable in many situations.

Based on the constraint, a reward function for determining a reward of a corrective action is defined as follows:

$$\underset{\theta}{\text{maximize}} \; \hat{\mathbb{E}}_t\left[\frac{\pi_\theta(a_t \mid s_t)}{\pi_{\theta_{old}}(a_t \mid s_t)}\hat{A}_t - \beta KL\big[\pi_{\theta_{old}}(\cdot \mid s_t), \pi_\theta(\cdot \mid s_t)\big]\right]$$

Where KL is a Kullback-Leiber divergence function that measures a distance between two distributions (i.e., between two corrective actions) provided as an output of model 1200. According to the reward function, when the distance between the two corrective actions is too large, the calculated reward is reduced. In this function, $\hat{A}_t$ represents a feedback of an impacts of a corrective action. In this manner, if $\hat{A}_t$ is positive (e.g., the corrective action creates positive feedback), the reward will be positive. Likewise, if $\hat{A}_t$ is negative (e.g., the corrective action creates negative feedback), the reward will be negative. In some embodiments, parameter changes (e.g., of a corrective action) are allowed to be adjusted within a trust region. More generally, the constraint allows model 1200 to explore a control space with a certain degree of freedom, to find a best possible action for an identified event condition.

In some embodiments, a reward value may be determined or calculated for each corrective action selected from a Gaussian distribution of potential corrective actions 1206. More generally, a reward value may be determined for each randomly selected corrective action to determine the impact of the corrective action. In some embodiments, the reward values for multiple corrective actions randomly selected from potential corrective actions 1206 may be compared, and a particular action with the highest or largest reward value may be selected for implementation (e.g., to control a device).

In some embodiments, both past rewards and future rewards for each potential corrective action 1206 are considered when selecting a corrective action. For example, past rewards associated with a particular corrective action (e.g., for a particular event condition) may be analyzed to determine whether the particular corrective action has a positive or large reward value for a past event condition. In another example, a future reward or plurality of future rewards may be determined for a given corrective action, such as by determining a reward value for potential future corrective actions if a selected corrective action is implemented. In some embodiments, a particular corrective action may not have a large or positive reward initially, but the particular corrective action may lead to a large or positive reward over time.

Figure 13:
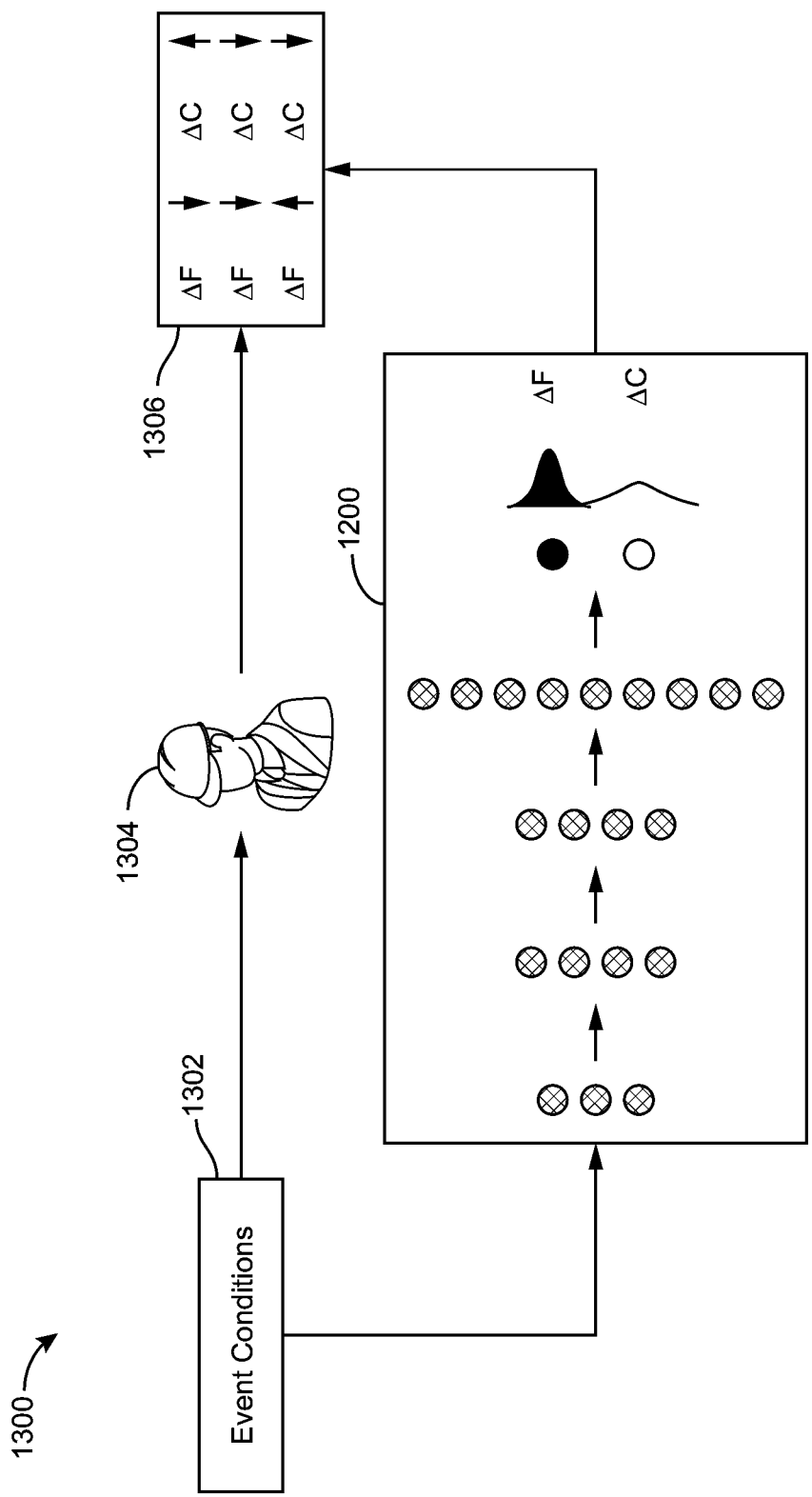
FIG. 13 is an initialization policy, according to some embodiments.

In some embodiments, model 1200 may be trained using domain knowledge (e.g., from a domain expert), as described with respect to FIG. 13. However, in other embodiments, model 1200 is not trained using domain knowledge and/or may be self-learning. In some embodiments, model 1200 may determine a corrective action for an event condition that is not previously identified or defined. In such embodiments, a reward value calculated for the corrective action generated by model 1200 may be used to determine a second or subsequent corrective action. For example, model 1200 may generate a random corrective action and the impact of the corrective action may be monitored to determine whether the reward was positive or negative. In the case of a positive reward, the subsequent corrective action may by similar to the first corrective action, whereas in the case of a negative reward, the subsequent corrective action may be significantly different from the first corrective action.

Referring now to FIG. 13, an initialization policy 1300 is shown, according to some embodiments. In some embodiments, policy 1300 may represent an initial policy or a training method for an agent, such as agent 710, and/or a model such as model 1200. In such embodiments, policy 1300 may illustrate steps taken to train a neural network for determining a corrective action based on an identified event condition, for example.

As shown, policy 1300 may include event conditions 1302 that may include any of the event conditions described herein with respect to fluid transfer equipment such as ESPs. Event conditions 1302 may be processed in two ways, by a domain expert 1304 and/or by model 1200. In some embodiments, policy 1300 illustrates only a portion of model 1200, where model 1200 does not include severities 1204 for example. In this manner, only the types of event conditions 1302 are used to train model 1200.

In some embodiments, model 1200 is first trained according to parameters set by one or more domain experts 1304. In this way, a trained instance of model 1200 may have the knowledge of a domain expert 1304 (e.g., a knowledgeable user or operator). Model 1200 may be pre-trained based on domain expert 1304 knowledge in situations where trial-and-error in selecting a corrective action is not feasible or not desirable. As in policy 1308, the outputs of model 1200 may be compared to an initial policy 1306, to determine how closely the outputs match a desired response. In some embodiments, initial policies 1306 may be similar to the policies described above with respect to Table 2. Based on the comparison of the outputs of model 1200 to initial policy 1306, model 1200 may be adjusted and/or retrained. Once the outputs of model 1200 match the initial policy 1306, it can be determined that model 1200, and thereby an agent that includes model 1200 (e.g., agent 710), may determine or generate potential corrective action (e.g., outputs) that closely match corrective actions that would be initiated by a domain expert (e.g., domain expert 1304).

In some embodiments, a pre-trained (e.g., according to predetermined policies) model 1200 may be called an "actor". In this case, model 1200 may act as a stand-in for a domain expert (e.g., domain expert 1304). For example, model 1200 may react to an event condition in a similar manner to the domain expert based on initial policy 1306.

In other embodiments, model 1200 is not first trained according to parameters set by one or more domain experts 1304. For example, in some systems (e.g., with some equipment), a certain amount of error in a generated or otherwise implement corrective action may be allowable. In such systems, model 1200 (e.g., and/or a system such as system 500 and/or agent 710) may be trained or may learn based on the calculated reward values for each determined corrective action. In some such embodiments, model 1200, and thereby an agent or system that utilizes a model such as model 1200, may not have prior domain knowledge, or may be forced to respond to an unknown or previously unidentified event condition. In this case, the reward value associated with a generated corrective action may determine whether the model/system is heading in the right direction, where a positive reward indicates a "good" corrective action and a negative reward indicates a "bad" corrective action.

Figure 14:
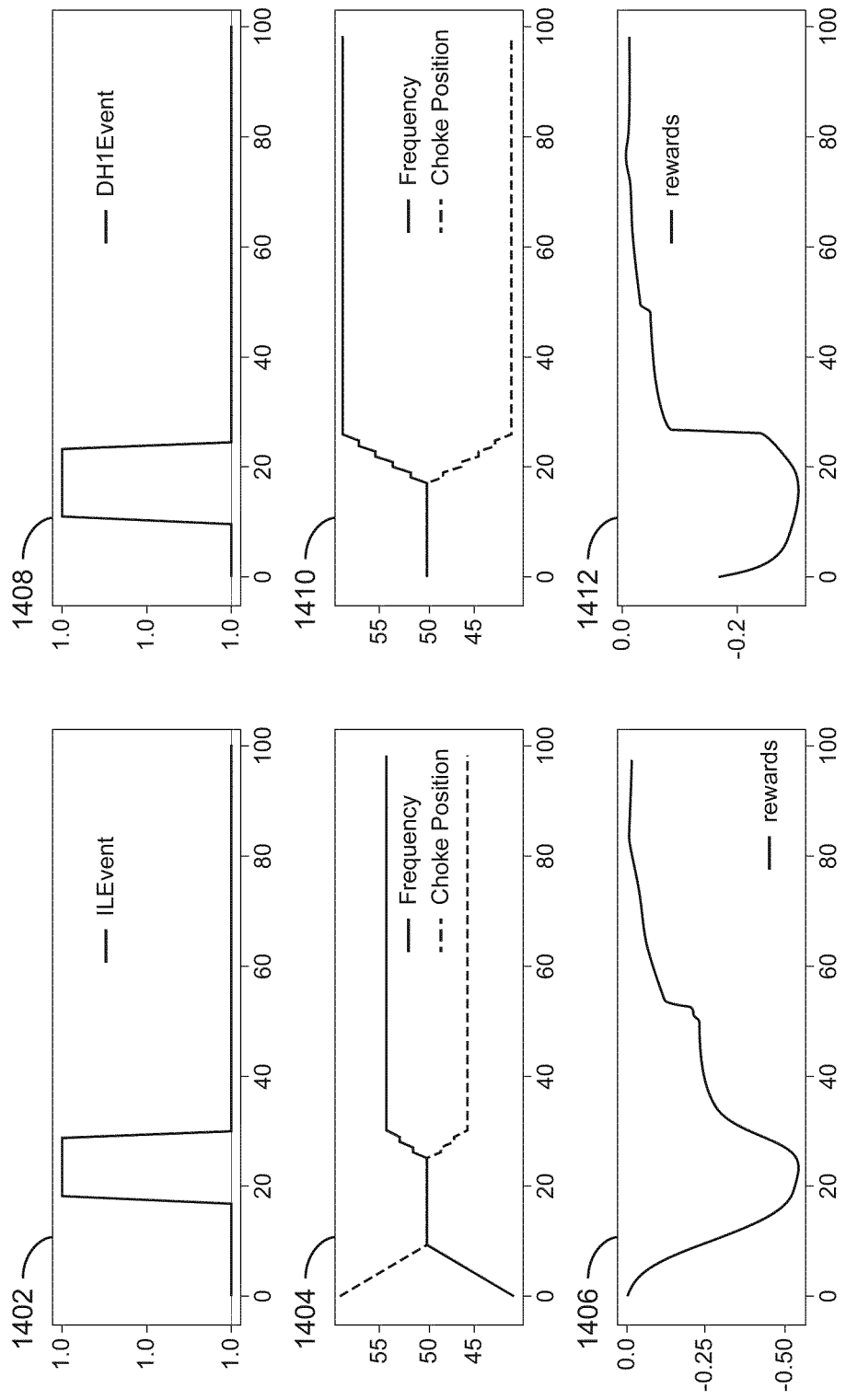
FIG. 14 is example graphic that illustrates recovery from an event condition for drilling, pipeline, or power quality equipment, according to various embodiments.

Referring now to FIG. 14, example graphs 1402-1414 that illustrate recovery from an event condition for drilling, pipeline, or power quality equipment are shown, according to various embodiments. As shown in graph 1402, for example, an IL event condition was detected for a drilling, pipeline, or power quality device (e.g., an ESP). Graph 1404 shows a response by a system or agent (e.g., system 500, module 600, and/or agent 710) to the IL condition. As shown, after detecting the IL event condition (e.g., by an AED engine), the system applies a corrective action that includes closing a choke and increasing a drive frequency for the device. In graph 1406, it is shown that a reward associated with the applied corrective action slowly increases as the corrective action is repeated (e.g., as evidenced by the "steps" in the frequency and choke position between time 20 and time 40). With the applied corrective action, the IL event condition is shown to end (e.g., the equipment is shown to recover) at approximately time 30.

As shown in graph 1408, a DH event condition is detected for a drilling, pipeline, or power quality device (e.g., an ESP). Graph 1410 shows a response by a system or agent (e.g., system 500, module 600, and/or agent 710) to the DH condition. In this case, a choke position is shown to increase (e.g., close) incrementally while a frequency is shown to decrease incrementally. With the closing choke and decreasing frequency, a reward associated with the corrective action(s) is shown to increase in graph 1412. At approximate time 25, the DH event is shown to end.

Figure 15:
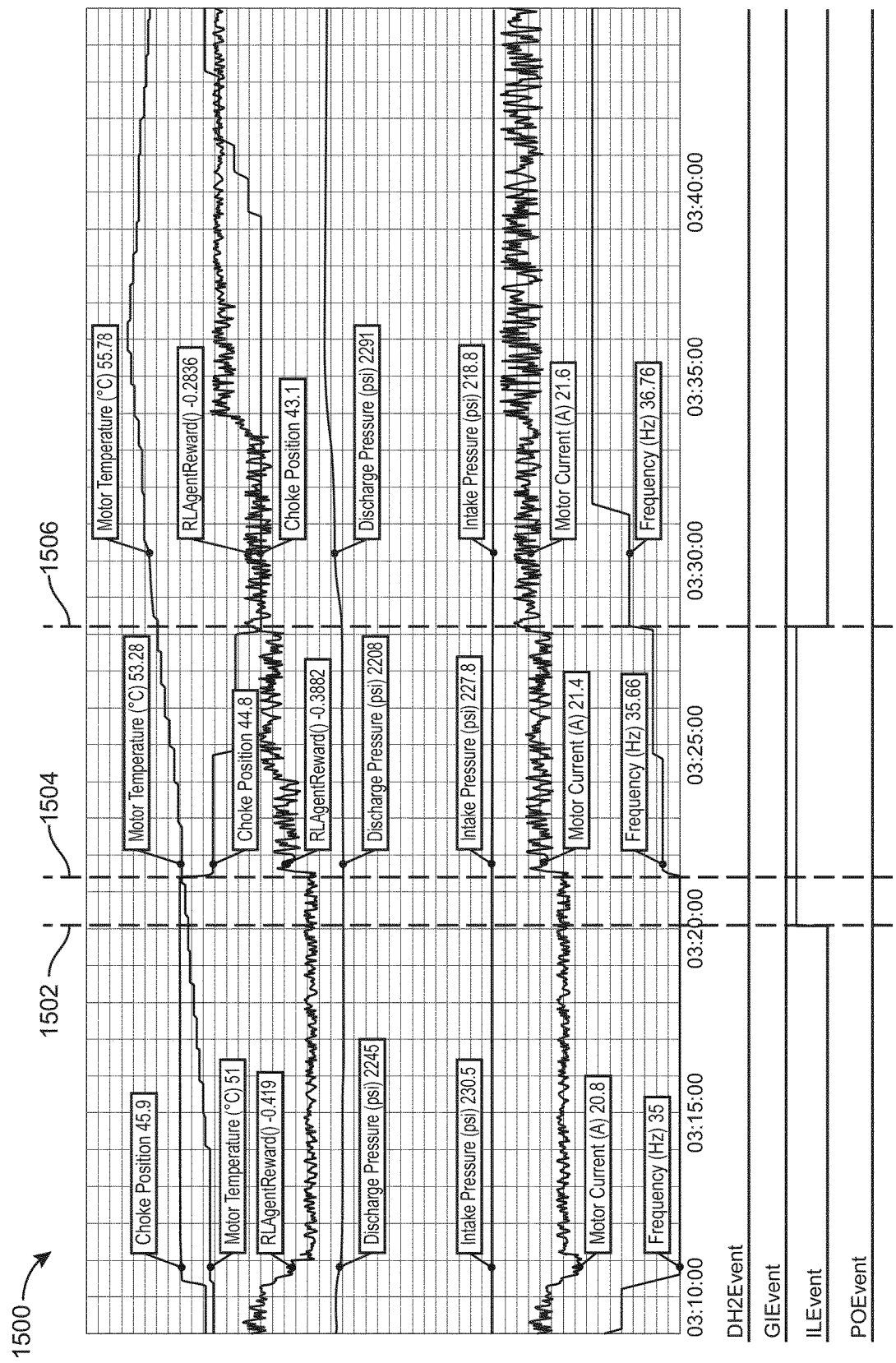
FIG. 15 is an example graph illustrating a simulated response of a control system for a drilling, pipeline, or power quality equipment, according to some embodiments.

Referring now to FIG. 15, an example graph 1500 illustrating a simulated response of a control system for a drilling, pipeline, or power quality device (e.g., system 500) is shown, according to some embodiments. For example, the event conditions shown at the bottom of graph 1500 (e.g., "DH2Event", "GIEvent", "ILEvent", "POEvent") may be determined based on input data from one or more sensors of a drilling, pipeline, or power quality device. Said sensor data may be partially represented by the lines of graph 1500, such as the "Discharge Pressure", "Intake Pressure", or "Motor Current" lines, for example. In this example, an AED such as AED engine 602 may determine whether the device is experiencing an event condition based on the sensor data. Based on an identified event condition, a corrective action may be applied to recover the equipment from the condition.

As shown, an IL event condition is detected at marker 1502. In response, a corrective action is implemented at marker 1504 that includes closing a choke and increasing a frequency (e.g., of a motor of the ESP). In response, a reward (e.g., "RLAgentReward") is shown to increase. In this manner, the system can associate the corrective action with a positive reward. Based on the positive reward, the corrective action is repeated, where the choke is closed further and the frequency is increased. This corrective action is repeated until marker 1506, where the IL event shown to cease, indicating that the equipment is no longer experiencing the event condition. After marker 1506, the frequency may be further increased, thereby increasing the reward and potentially preventing future IL events.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for oil and gas production, the system comprising:
    a drilling, pipeline, or power quality equipment;
    a sensor associated with the drilling, pipeline, or power quality equipment; and
    a storage device having instructions stored thereon that, when executed by one or more processors, cause the one or more processors to perform operations comprising:
        receiving first data from the sensor, the first data indicating a parameter of the drilling, pipeline, or power quality equipment;
        determining whether the drilling, pipeline, or power quality equipment is experiencing an event condition based on the first data;
        generating one or more potential corrective actions responsive to a determination that the drilling, pipeline, or power quality equipment is experiencing the event condition, the one or more potential corrective actions each comprising controlling operation of a fluid transfer device, resulting in a change to the parameter of the drilling, pipeline, or power quality equipment, and generating the one or more potential corrective actions comprises:
            determining a severity associated with the event condition,
            inputting the severity of the event condition and a type of the event condition to a model of the system, and
            selecting, from an output of the model, the one or more potential corrective actions, wherein the output of the model is a Gaussian distribution of potential actions;
        calculating a reward value for each of the one or more potential corrective actions;
        identifying a first corrective action of the one or more potential corrective actions with a largest or a most positive reward value;
        controlling the fluid transfer device to implement to the first corrective action comprising sending a first control signal to the fluid transfer device, wherein the first corrective action comprises at least one of increasing a drive frequency of the fluid transfer device, adjusting a choke position of the fluid transfer device, or reversing a rotational direction of an impeller of the fluid transfer device;
        determining whether the drilling, pipeline, or power quality equipment is experiencing a subsequent event condition; and
        controlling the fluid transfer device to implement a subsequent corrective action comprising sending a second control signal to the fluid transfer device, the subsequent corrective action based on at least a set of subsequent data received from the sensor and the first corrective action.

2. The system of claim 1, wherein the operations further comprise receiving second data from the sensor associated with the drilling, pipeline, or power quality equipment, the second data received after controlling the fluid transfer device based on the first corrective action, wherein the reward value for the first corrective action is based in part on the second data and wherein the drilling, pipeline, or power quality equipment comprises the fluid transfer device.

3. The system of claim 2, wherein the operations further comprise:
    determining whether the drilling, pipeline, or power quality equipment is still experiencing the event condition based on the second data;
    generating a second corrective action based on a determination that the drilling, pipeline, or power quality equipment is still experiencing the event condition; and controlling the fluid transfer device based on the second corrective action.

4. The system of claim 1, wherein the operations further comprise training the model according to a predetermined policy.

5. A system for oil and gas production, the system comprising:
a drilling, pipeline, or power quality equipment;
a sensor associated with the drilling, pipeline, or power quality equipment; and
a storage device having instructions stored thereon that, when executed by one or more processors, cause the one or more processors to perform operations comprising:
receiving first data from the sensor, the first data indicating a parameter of the drilling, pipeline, or power quality equipment;
determining whether the drilling, pipeline, or power quality equipment is experiencing an event condition based on the first data, wherein determining whether the drilling, pipeline, or power quality equipment is experiencing the event condition comprises:
determining a likelihood for one or more event conditions associated with the drilling, pipeline, or power quality equipment; and
comparing the likelihood for the one or more event conditions, wherein a condition of the one or more event conditions with a highest likelihood is identified as the event condition;
generating one or more potential corrective actions responsive to a determination that the device is experiencing the event condition, the one or more potential corrective actions each comprising controlling operation of a fluid transfer device, resulting in a change to the parameter of the drilling, pipeline, or power quality device equipment;
calculating a reward value for each of the one or more potential corrective actions;
identifying a first corrective action of the one or more potential corrective actions with a largest or a most positive reward value;
controlling the fluid transfer device to implement the first corrective action comprising sending a first control signal to the fluid transfer device, wherein the first corrective action comprises at least one of increasing a drive frequency of the fluid transfer device, adjusting a choke position of the fluid transfer device, or reversing a rotational direction of an impeller of the fluid transfer device;
determine whether the drilling, pipeline, or power quality equipment is experiencing a subsequent event condition; and
controlling the fluid transfer device to implement a subsequent corrective action, comprising sending a second control signal to the fluid transfer device, the subsequent corrective action based on at least a set of subsequent data received from the sensor and the first corrective action.

6. The system of claim 1, wherein calculating the reward value for each of the one or more potential corrective actions further comprises determining a past reward value and a future reward value for each of the one or more potential corrective actions, wherein the reward value for each of the one or more potential corrective actions is based in part on the past reward value and the future reward value.

7. The system of claim 1, wherein the one or more potential corrective actions are generated according to a constraint that limits the change to the parameter of the drilling, pipeline, or power quality equipment.

8. The system of claim 1, wherein the operations further comprise determining an impact of each of the one or more potential corrective actions on a likelihood for each of one or more other event conditions, wherein the reward value for each of the one or more potential corrective actions is based in part on the impact.

9. A method for automatic event detection and correction for oil and gas production equipment, the method comprising:
receiving first data from a sensor associated with the oil and gas production equipment, the first data indicating a parameter of the oil and gas production equipment;
determining whether the oil and gas production equipment is experiencing an event condition based on the first data;
generating one or more potential corrective actions responsive to a determination that the oil and gas production equipment is experiencing the event condition, the one or more potential corrective actions each comprising controlling operation of a fluid transfer device, resulting in a change to the parameter of the oil and gas production equipment, wherein generating the one or more potential corrective actions further comprises:
determining a severity associated with the event condition,
inputting the severity of the event condition and a type of the event condition to a model of the oil and gas production equipment, and
selecting, from an output of the model, the one or more potential corrective actions, wherein the output of the model is a Gaussian distribution of potential actions;
calculating a reward value for each of the one or more potential corrective actions;
identifying a first corrective action of the one or more potential corrective actions with a largest or a most positive reward value;
controlling the fluid transfer device to implement the first corrective action comprising sending a first control signal to the fluid transfer device, wherein the first corrective action comprises at least one of increasing a drive frequency of the fluid transfer device, adjusting a choke position of the fluid transfer device, or reversing a rotational direction of an impeller of the fluid transfer device;
receiving second data from the sensor associated with the oil and gas production equipment;
determining whether the oil and gas production equipment is still experiencing the event condition based on the second data;
generating a second corrective action based on a determination that the oil and gas production equipment is still experiencing the event condition; and
controlling the fluid transfer device to implement the second corrective action comprising sending a second control signal to the fluid transfer device.

10. The method of claim 9, further comprising training the model according to a predetermined policy.

11. The method of claim 9, wherein calculating the reward value for each of the one or more potential corrective actions further comprises determining a past reward value and a future reward value for each of the one or more potential corrective actions, wherein the reward value for each of the one or more potential corrective actions is based in part on the past reward value and the future reward value.

12. The method of claim 9, wherein the one or more potential corrective actions are generated according to a constraint that limits the change to the parameter of the oil and gas production equipment.

13. The method of claim 9, further comprising determining an impact of each of the one or more potential corrective actions on a likelihood for each of one or more other event conditions, wherein the reward value for each of the one or more potential corrective actions is based in part on the impact.

14. A method for automatic event detection and correction for oil and gas production equipment, the method comprising:
- receiving first data from a sensor associated with the oil and gas production equipment, the first data indicating a parameter of the oil and gas production equipment;
- determining whether the oil and gas production equipment is experiencing an event condition based on the first data, wherein determining whether the oil and gas production equipment is experiencing the event condition comprises:
  - determining a likelihood for one or more event conditions associated with the oil and gas production equipment; and
  - comparing the likelihood for the one or more event conditions, wherein a condition of the one or more event conditions with a highest likelihood is identified as the event condition;
- generating one or more potential corrective actions responsive to a determination that the oil and gas production equipment is experiencing the event condition, the one or more potential corrective actions each comprising controlling operation of a fluid transfer device, resulting in a change to the parameter of the oil and gas production equipment;
- calculating a reward value for each of the one or more potential corrective actions;
- identifying a first corrective action of the one or more potential corrective actions with a largest or a most positive reward value;
- controlling the fluid transfer device to implement the first corrective action comprising sending a first control signal to the fluid transfer device, wherein the first corrective action comprises at least one of increasing a drive frequence of the fluid transfer device, adjusting a choke position of the fluid transfer device, or reversing a rotational direction of an impeller of the fluid transfer device;
- receiving second data from the sensor associated with the oil and gas production equipment;
- determining whether the oil and gas production equipment is still experiencing the event condition based on the second data;
- generating a second corrective action based on a determination that the oil and gas production equipment is still experiencing the event condition; and
- controlling the fluid transfer device to implement the second corrective action comprising sending a second control signal to the fluid transfer device.

15. A system comprising:
- electrical or mechanical oil and gas production equipment;
- a sensor associated with the electrical or mechanical oil and gas production equipment; and
- a controller configured to:
  - receive first data from the sensor associated with the electrical or mechanical oil and gas production equipment, the first data indicating a parameter of the electrical or mechanical oil and gas production equipment;
  - determine whether the electrical or mechanical oil and gas production equipment is experiencing an event condition based on the first data, by:
    - determining a likelihood for one or more event conditions associated with the electrical or mechanical oil and gas production equipment;
    - comparing the likelihood for the one or more event conditions, wherein a condition of the one or more event conditions with a highest likelihood is identified as the event condition;
  - generate a first corrective action responsive to a determination that the electrical or mechanical oil and gas production equipment is experiencing the event condition, the first corrective action comprising controlling operation of a fluid transfer device resulting in a change to the parameter of the electrical or mechanical oil and gas production equipment, wherein the first corrective action is generated according to a constraint that limits the change to the parameter of the electrical or mechanical oil and gas production equipment;
  - control the fluid transfer device to implement the first corrective action comprising sending a first control signal to the fluid transfer device, wherein the first corrective action comprises at least one of increasing a drive frequency of the fluid transfer device, adjusting a choke position of the fluid transfer device, or reversing a rotational direction of an impeller of the fluid transfer device;
  - receive second data from the sensor associated with the equipment, the second data received after controlling the fluid transfer device based on the first corrective action;
  - determine a reward value for the first corrective action based on the second data; and
  - in response to the reward value being desirable, control the fluid transfer device to continue to implement the first corrective action until the equipment is no longer experiencing the event condition.

16. The system of claim 15, wherein the first corrective action is generated by:
- inputting a type of the event condition into a model of the system;
- determining, based on an output of the model, a plurality of potential corrective actions; and
- selecting, from the plurality of potential corrective actions, the first corrective action.

* * * * *